United States Patent
Maerten et al.

(10) Patent No.: US 11,415,724 B2
(45) Date of Patent: Aug. 16, 2022

(54) DOWNHOLE MODELING USING INVERTED PRESSURE AND REGIONAL STRESS

(71) Applicant: Schlumberger Technology Corporation, Sugar Land, TX (US)

(72) Inventors: Frantz Maerten, Pignan (FR); Laurent Maerten, Clapiers (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 772 days.

(21) Appl. No.: 16/065,124

(22) PCT Filed: Jan. 26, 2017

(86) PCT No.: PCT/US2017/014999
§ 371 (c)(1),
(2) Date: Jun. 21, 2018

(87) PCT Pub. No.: WO2017/136208
PCT Pub. Date: Aug. 10, 2017

(65) Prior Publication Data
US 2018/0372911 A1    Dec. 27, 2018

(30) Foreign Application Priority Data
Feb. 3, 2016    (FR) ..................... 1650864

(51) Int. Cl.
*G01V 99/00* (2009.01)
*G06Q 50/02* (2012.01)
(52) U.S. Cl.
CPC .... *G01V 99/005* (2013.01); *G01V 2210/6242* (2013.01); *G01V 2210/642* (2013.01); *G01V 2210/646* (2013.01); *G06Q 50/02* (2013.01)
(58) Field of Classification Search
CPC ......... G01V 99/005; G01V 2210/6242; G01V 2210/642; G01V 2210/646; G06Q 50/02
See application file for complete search history.

(56) References Cited

U.S. PATENT DOCUMENTS

| | | |
|---|---|---|
| 6,473,696 B1 | 10/2002 | Onyia et al. |
| 7,677,306 B2 | 3/2010 | Lecampion et al. |
| (Continued) | | |

FOREIGN PATENT DOCUMENTS

| | | |
|---|---|---|
| FR | 3019345 A1 | 10/2015 |
| GB | 2524964 A | 11/2015 |
| WO | 2015/102791 A1 | 7/2015 |

OTHER PUBLICATIONS

Volgyesi, Lajos & Moser, M. (1982). The Inner Structure of the Earth. Periodica Polytechnica Chemical Engineering. 26. (Year: 1982).*

(Continued)

*Primary Examiner* — Chuen-Meei Gan

(57) ABSTRACT

A method for predicting a stress attribute of a subsurface earth volume includes simulating a linearly independent far field stress model, a discontinuity pressure model, and a discontinuity pressure shift model for the subsurface earth volume. A stress value, a discontinuity pressure shift at a surface of the Earth, a strain value, a displacement value, or a combination thereof is computed for data points in the subsurface earth volume based on a superposition of the linearly independent far field stress model, the discontinuity pressure models, and the discontinuity pressure shift model. The stress attribute of the subsurface earth volume is predicted, based on the computed stress value, the computed discontinuity pressure shift at the surface of the Earth, the computed strain value, the computed displacement value, or the combination thereof.

16 Claims, 15 Drawing Sheets

(56) References Cited

U.S. PATENT DOCUMENTS

| | | |
|---|---|---|
| 8,339,897 B2 | 12/2012 | Aeron et al. |
| 8,464,794 B2 | 6/2013 | Schultz et al. |
| 2002/0157478 A1 | 10/2002 | Seale |
| 2003/0004648 A1 | 1/2003 | Huffman et al. |
| 2005/0125209 A1 | 6/2005 | Soliman et al. |
| 2008/0319675 A1 | 12/2008 | Sayers |
| 2010/0020642 A1 | 1/2010 | Sinha |
| 2010/0121623 A1 | 5/2010 | Yogeswaren |
| 2010/0157730 A1* | 6/2010 | Bradford ............... G01V 1/30 367/38 |
| 2010/0191511 A1 | 7/2010 | Hsu et al. |
| 2010/0220895 A1 | 9/2010 | Koren et al. |
| 2011/0072188 A1 | 3/2011 | Oh et al. |
| 2012/0072188 A1* | 3/2012 | Maerten ............... G01V 99/005 703/2 |
| 2012/0173216 A1* | 7/2012 | Koepsell ............... E21B 49/00 703/6 |
| 2013/0079935 A1 | 3/2013 | Kabannik et al. |
| 2013/0191044 A1* | 7/2013 | Maerten ............... G06F 17/00 702/42 |
| 2013/0289962 A1* | 10/2013 | Wendt ............... G01V 11/00 703/10 |
| 2014/0067269 A1 | 3/2014 | Maerten et al. |
| 2015/0168597 A1* | 6/2015 | Bai ............... G01V 99/00 703/10 |
| 2015/0205006 A1* | 7/2015 | Maerten ............... G01V 99/005 703/2 |
| 2016/0011333 A1* | 1/2016 | Maerten ............... G01V 99/005 702/2 |
| 2016/0018542 A1* | 1/2016 | Maerten ............... G01V 1/282 702/16 |

OTHER PUBLICATIONS

Curran, et al., "A displacement discontinuity model for fluid-saturated porous media," 6th ISRM Congress, International Society for Rock Mechanics, 1987.

Mace, et al., "Integration of fracture data into 3d geomechanical modeling to enhance fractured reservoirs characterization," SPE Annual Technical Conference and Exhibition, Society of Petroleum Engineers, 2005.

Maerten, "Geomechanics to solve geological structure issues: forward, inverse and restoration modeling," 455 pp, University of Montpellier II, France 2010.

Maerten, et al., "Inverting for slip on three-dimensional fault surfaces using angular dislocations," Bulletin of the Seismological Society of America, 95, pp. 1654-1665, 2005.

Maerten, et al., "Solving 3d boundary element problems using constrained iterative approach," Computational Gesciences, 2009.

Thomas, "Poly 3D: a three-dimensional, polygonal element, displacement discontinuity boundary element computer program with applications to fractures, faults, and cavities in the earth's crust," Master thesis, Stanford University, 1995.

Examination Report for the cross referenced UK patent application 1503711.2 dated Sep. 8, 2015.

International Search Report and Written Opinion for the equivalent International patent application PCT/US2017/0014999 dated May 1, 2017.

International Preliminary Report on Patentability for the equivalent International patent application PCT/US2017/0014999 dated Aug. 16, 2018.

Extended Search Report for the equivalent European patent application 17747938.3 dated Aug. 27, 2019.

Communication Pursuant to Article 94(3) for the equivalent European patent application 17747938.3 dated Aug. 3, 2021, 5 pages.

Otto H. Muller et al., "The Stress State Near Spanish Peaks, Colorado Determined From a Dike Pattern", Pageoph, vol. 115 (1977), Birkhauser Verlag, Basel, 18 pages.

Jeyakumaran, M. et al., "Modeling Slip Zones With Triangular Dislocation Elements," Bulletin of the Seismological Society of America, vol. 82, No. 5, pp. 2153-2169, Oct. 1992.

* cited by examiner

DOWNHOLE MODELING USING INVERTED PRESSURE AND REGIONAL STRESS

CROSS-REFERENCE TO RELATED APPLICATIONS

This application claims priority to French Patent Application No. 1650864, filed on Feb. 3, 2016, which is incorporated herein by reference in its entirety.

BACKGROUND

A fault may be considered a finite complex three-dimensional surface discontinuity in a volume of earth or rock. Fractures, such as joints, veins, dikes, pressure solution seams with stylolites, and so forth, may be propagated intentionally, to increase permeability in formations such as shale, in which optimizing the number, placement, and size of fractures in the formation increases the yield of resources like shale gas.

Stress, in continuum mechanics, may be considered a measure of the internal forces acting within a volume. Such stress may be defined as a measure of the average force per unit area at a surface within the volume on which internal forces act. The internal forces are oftentimes produced between the particles in the volume as a reaction to external forces applied on the volume.

Understanding the origin and evolution of faults and the tectonic history of faulted regions can be accomplished by relating fault orientation, slip direction, geologic and geodetic data to the state of stress in the Earth's crust. In conventional inverse problems, the directions of the remote principal stresses and a ratio of their magnitudes are constrained by analyzing field data on fault orientations and slip directions as inferred from artifacts such as striations on exposed fault surfaces.

Conventional methods for stress inversion, using measured striations and/or throw on faults, are mainly based on the assumptions that the stress field is uniform within the rock mass embedding the faults (assuming no perturbed stress field), and that the slip on faults have the same direction and sense as the resolved far field stress on the fault plane. However, it has been shown that slip directions are affected by: anisotropy in fault compliance caused by irregular tip-line geometry; anisotropy in fault friction (surface corrugations); heterogeneity in host rock stiffness; and perturbation of the local stress field mainly due to mechanical interactions of adjacent faults. Mechanical interactions due to complex faults geometry in heterogeneous media can be taken into account while doing the stress inversion. By doing so, determining the parameters of such paleostress (and fluid pressure inside fault surfaces) in the presence of multiple interacting faults is determined by running numerous simulations, which takes an enormous amount of computation time to fit the observed data. The conventional parameters space has to be scanned for each possibility, and for each simulation, the model and the post-processes are recomputed.

Motion equations are oftentimes not invoked while using conventional methods, and perturbations of the local stress field by fault slip are ignored. The mechanical role played by the faults in tectonic deformation is not explicitly included in such analyses. Still, a relatively full mechanical treatment is applied for conventional paleostress inversion. However, the results may be greatly improved if multiple types of data could be used to better constrain the inversion.

SUMMARY

A method, a computer-readable medium, and a system for predicting a stress attribute of a subsurface earth volume are disclosed. The method includes simulating a linearly independent far field stress model, a discontinuity pressure model, and a discontinuity pressure shift model for the subsurface earth volume. A stress value, a discontinuity pressure shift at a surface of the Earth (e.g., at z=0), a strain value, a displacement value, or a combination thereof is/are computed for data points in the subsurface earth volume based on a superposition of the linearly independent far field stress model, the discontinuity pressure model, and the one or more discontinuity pressure shift model. The stress attribute of the subsurface earth volume is predicted, based on the computed stress value, the computed discontinuity pressure shift at the surface of the Earth, the computed strain value, the computed displacement value, or the combination thereof.

The foregoing summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 4A depicts a technique that uses slip distributions on faults as data input, but provides unstable results. FIG. 4B depicts a (2D) Monte Carlo method, but without the optimization using the principle of superposition. FIG. 4C depicts the method described herein, including techniques that utilize the principle of superposition and drastically reduce the complexity of the model.

FIG. 5A shows an orientation of $\sigma_3$ relative to an opening fracture (joints, veins, dikes) given by its normal $\bar{n}$ in 3D. FIG. 5B shows the same as FIG. 5A, except for an orientation of $\sigma_3$ relative to a joint given by its projected normal $\bar{n}$ (e.g., trace on outcrop). FIG. 5C and FIG. 5D show the same as FIG. 5A and FIG. 5B, except shown for a stylolite. FIG. 5E shows orientation of $\sigma_2$ and $\sigma_1$ relative to conjugate fault-planes given by one of the normal $\bar{n}$ in 3D and the internal friction angle $\theta$.

FIG. 7A shows the cost function for the normal fault, and FIG. 7B shows the cost function for the thrust fault.

FIG. 11A presents a model configuration showing the horizon and the fault surface. FIG. 11B shows a comparison of the original dip-slip (left) and the recovered dip-slip (right). FIG. 11C shows a comparison of the original strike-slip (left) and the recovered strike-slip (right).

FIG. 11D shows original vertical displacement (left) from the flattened horizon (left) and recovered vertical displacement (right) from the flattened horizon.

DETAILED DESCRIPTION

Figure 1:
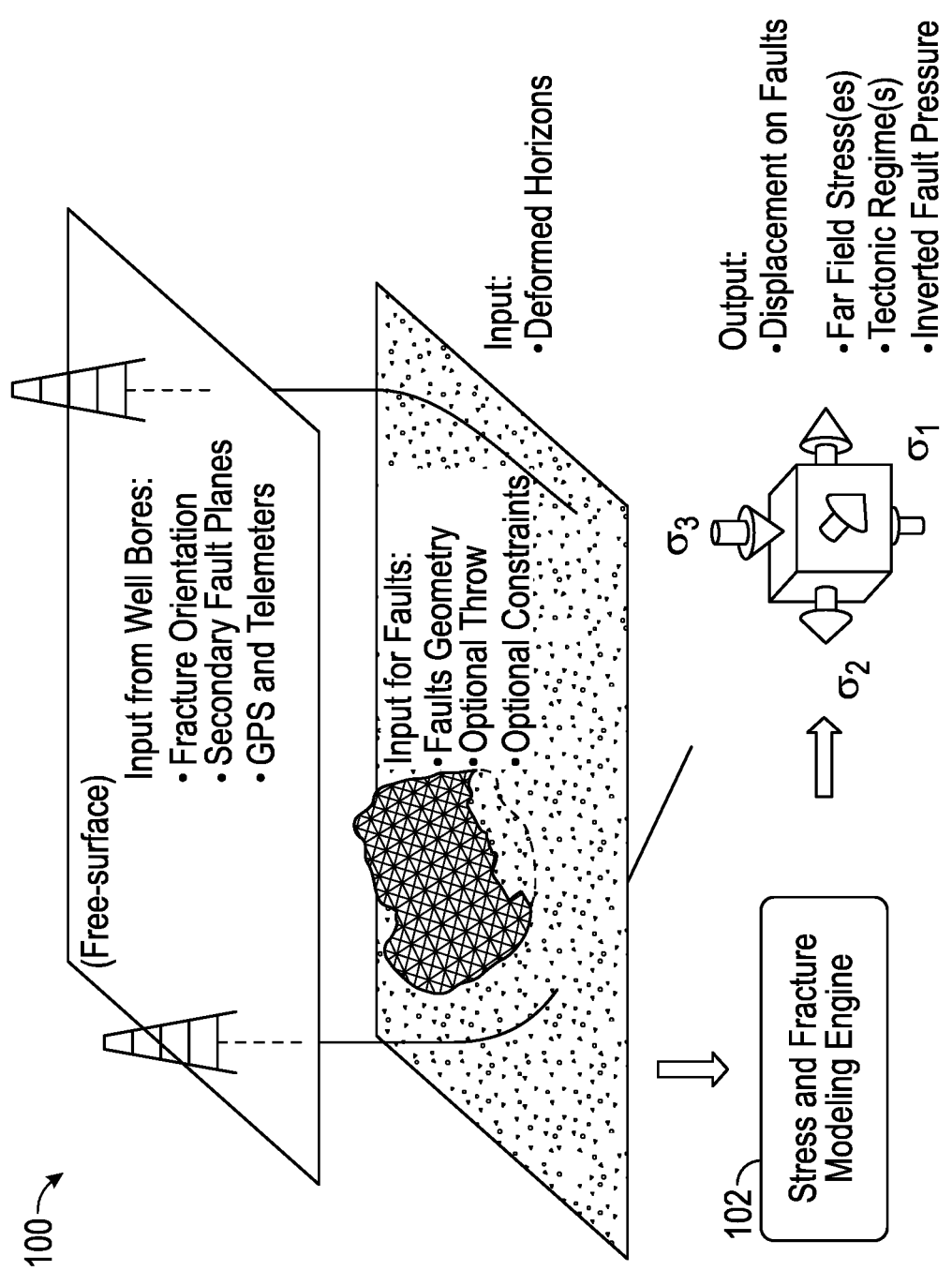
FIG. 1 depicts a diagram of an illustrative stress and fracture modeling system, according to one or more embodiments disclosed.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

This disclosure describes stress and fracture modeling using the principle of superposition. Given diverse input data, such as faults geometry, and selectable or optional data sets or data measures, including fault throw, dip-slip or slickline directions, stress measurements, fracture data, secondary fault plane orientations, global positioning system (GPS) data, interferometric synthetic aperture radar (InSAR) data, geodetic data from surface tilt-meters, laser ranging, etc., the systems and methods described herein can quickly generate and/or recover numerous types of results. The systems and methods described herein apply the principle of superposition to fault surfaces with complex geometry in 2D and/or 3D, and the faults are, by nature, of finite dimension and not infinite or semi-infinite. The results are often rendered in real-time and may include, for example, real-time stress, strain, and/or displacement parameters in response to a user query or an updated parameter; remote stress states for multiple tectonic events; prediction of intended future fracturing; differentiation of preexisting fractures from induced fractures; and so forth. The diverse input data can be derived from wellbore data, seismic interpretation, field observation, etc.

The systems and methods described below are applicable to many different reservoir and subsurface operations, including exploration and production operations for natural gas and other hydrocarbons, storage of natural gas, hydraulic fracturing and matrix stimulation to increase reservoir production, water resource management including development and environmental protection of aquifers and other water resources, capture and underground storage of carbon dioxide ($CO_2$), and so forth.

The system can apply a 3-dimensional (3D) boundary element technique using the principle of superposition that applies to linear elasticity for heterogeneous, isotropic whole- or half-space media. Based on precomputed values, the system can assess a cost function to generate real-time results, such as stress, strain, and displacement parameters for any point in a subsurface volume as the user varies the far field stress value and the fault pressure. In one implementation, the system uses fault geometry and wellbore data, including, e.g., fracture orientation, secondary fault plane data, and/or in-situ stress measurement by hydraulic fracture, to recover one or more tectonic events and fault pressures, or one or more stress tensors represented by a ratio of principal magnitudes and the associated orientation and fault pressures. The system can use many different types of geologic data from seismic interpretation, wellbore readings, and field observation to provide a variety of results, such as predicted fracture propagation based on perturbed stress field.

FIG. 1 shows an illustrative stress and fracture modeling system 100, according to one or more embodiments disclosed. The faults geometry is often known (and optionally, measured fault throw and imposed inequality constraints such as normal, thrust, etc., may be known). The user may have access to data from wellbores (e.g., fracture orientation, in-situ stress measurements, secondary fault planes), geodetic data (e.g., InSAR, GPS, and tilt-meter), as well as interpreted horizons. A stress and fracture modeling engine 102 can recover the remote stress state and tectonic regime for relevant tectonic events and fault pressure, as well as displacement discontinuity on faults, and estimate the displacement and perturbed strain and stress fields anywhere within the system.

Using the principle of superposition, the stress and fracture modeling system 100 or engine 102 may perform each of three linearly independent simulations of stress tensor models and one fault pressure model in constant time regardless of the complexity of each underlying model. Each model does not have to be recomputed. Then, as introduced above, applications for the system 100 may include stress interpolation and fracture modeling, recovery of tectonic events, quality control on interpreted faults, real-time computation of perturbed stress and displacement fields when the user is performing parameters estimation, prediction of fracture propagation, distinguishing preexisting fractures from induced fractures, and numerous other applications.

Figure 2:
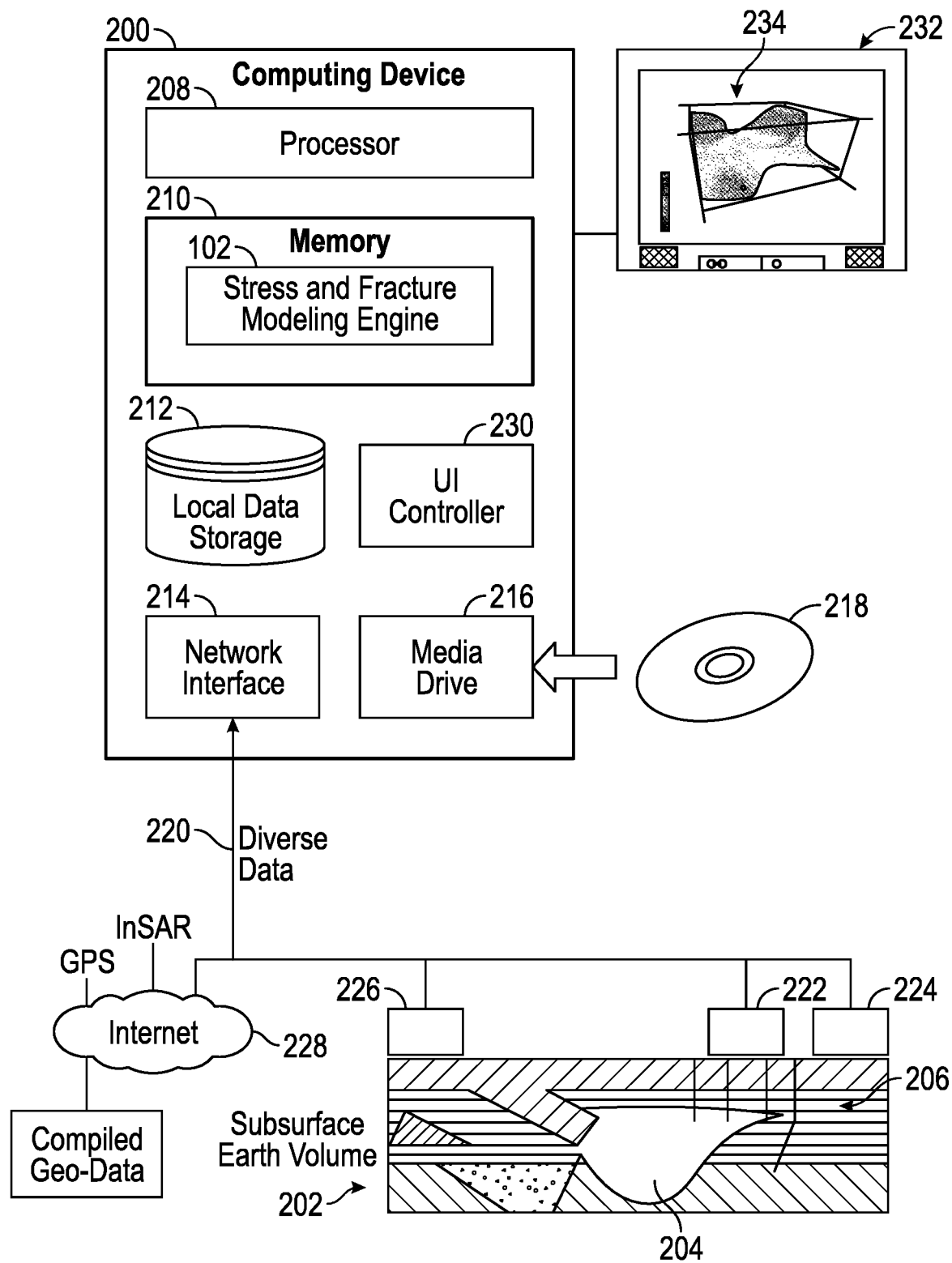
FIG. 2 depicts a block diagram of an illustrative computing environment for performing stress and fracture modeling using the principle of superposition, according to one or more embodiments disclosed.

FIG. 2 shows the system 100 of FIG. 1 in the context of a computing environment, in which stress and fracture modeling using the principle of superposition can be performed, according to one or more embodiments disclosed.

A computing device 200 implements a component, such as the stress and fracture modeling engine 102. The stress and fracture modeling engine 102 is illustrated as software, but can be implemented as hardware or as a combination of hardware and software instructions.

The computing device 200 may be communicatively coupled via sensory devices (and control devices) with a real-world setting, for example, an actual subsurface earth volume 202, reservoir 204, depositional basin, seabed, etc., and associated wells 206 for producing a petroleum resource, for water resource management, or for carbon services, and so forth.

The computing device 200 may be a computer, computer network, or other device that has a processor 208, memory 210, data storage 212, and other associated hardware such as a network interface 214 and a media drive 216 for reading and writing a removable storage medium 218. The removable storage medium 218 may be, for example, a compact disk (CD); digital versatile disk/digital video disk (DVD); flash drive, etc. The removable storage medium 218 contains instructions, which when executed by the computing device 200, cause the computing device 200 to perform one or more methods described herein. Thus, the removable storage medium 218 may include instructions for implementing and executing the stress and fracture modeling engine 102. At least some parts of the stress and fracture modeling engine 102 can be stored as instructions on a given instance of the removable storage medium 218, removable device, or in local data storage 212, to be loaded into memory 210 for execution by the processor 208.

Although the stress and fracture modeling engine 102 is depicted as a program residing in memory 210, in other embodiments, the stress and fracture modeling engine 102 may be implemented as hardware, such as an application specific integrated circuit (ASIC) or as a combination of hardware and software.

The computing device 200 may receive incoming data 220, such as faults geometry and many other kinds of data, from multiple sources, such as wellbore measurements 222, field observation 224, and seismic interpretation 226. The computing device 200 can receive many types of data sets 220 via the network interface 214, which may also receive data from the Internet 228, such as GPS data and InSAR data.

The computing device 200 may compute and compile modeling results, simulator results, and control results, and a display controller 230 may output geological model images and simulation images and data to a display 232. The images may be a 2D or 3D simulation 234 of stress and fracture results using the principle of superposition. The stress and fracture modeling engine 102 may also generate one or more visual user interfaces (UIs) for input and display of data.

The stress and fracture modeling engine 102 may also generate and/or produce control signals to be used via control devices, e.g., such as drilling and exploration equipment, or well control injectors and valves, in real-world control of the reservoir 204, transport and delivery network, surface facility, and so forth.

Thus, the system 100 may include a computing device 200 and an interactive graphics display unit 232. The system 100 as a whole may constitute simulators, models, and the example stress and fracture modeling engine 102.

Figure 3:
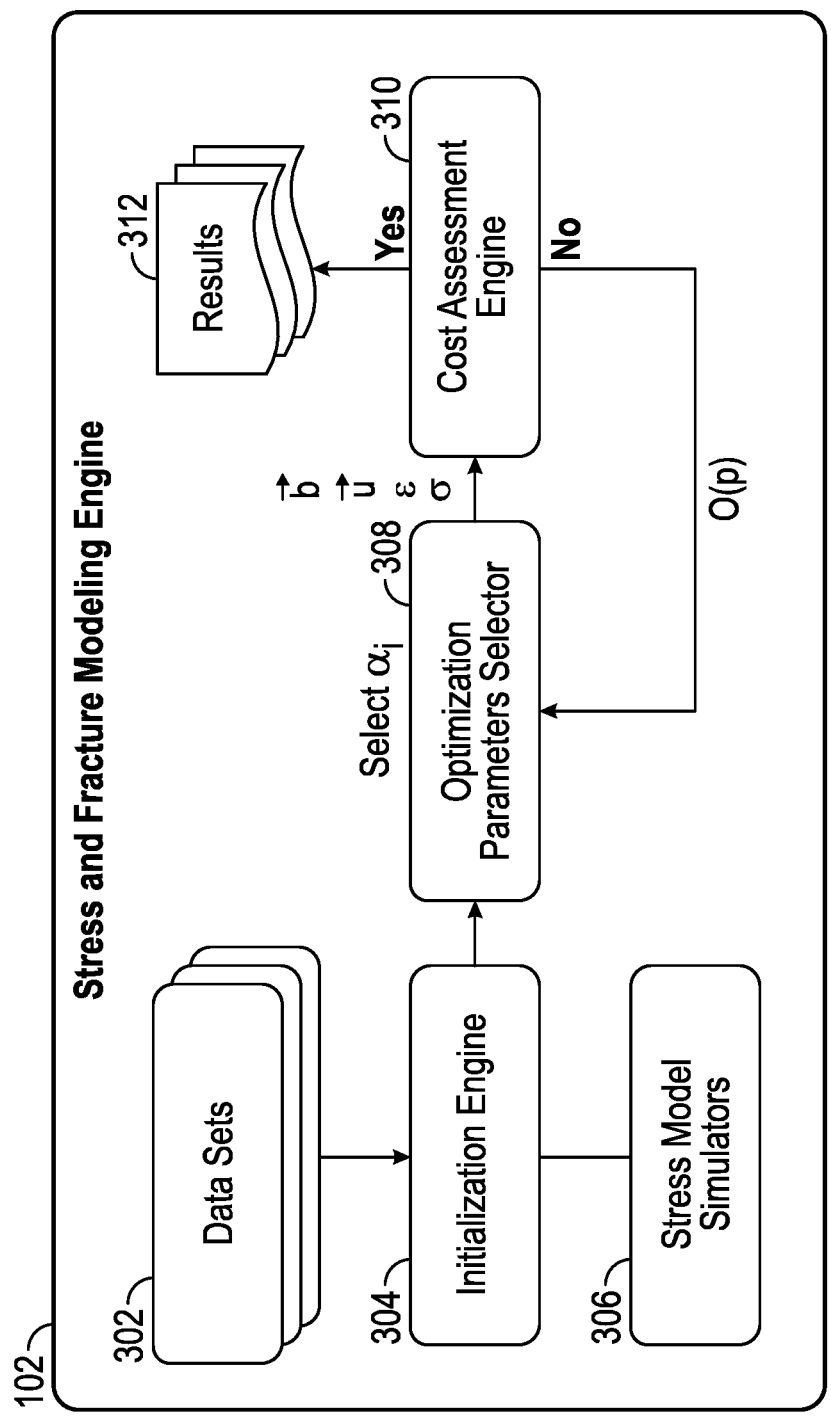
FIG. 3 depicts a block diagram of an illustrative stress and fracture modeling engine, according to one or more embodiments disclosed.

FIG. 3 shows the stress and fracture modeling engine 102 in greater detail, according to one or more embodiments disclosed. The stress and fracture modeling engine 102 illustrated in FIG. 3 includes a buffer for data sets 302 or access to the data sets 302, an initialization engine 304, stress model simulators 306 or an access to the stress model simulators 306, a optimization parameters selector 308, a cost assessment engine 310, and a buffer or output for results 312. Other components, or other arrangements of the components, may also be used to enable various implementations of the stress and fracture modeling engine 102. The functionality of the stress and fracture modeling engine 102 will be described next.

Figure 4A:
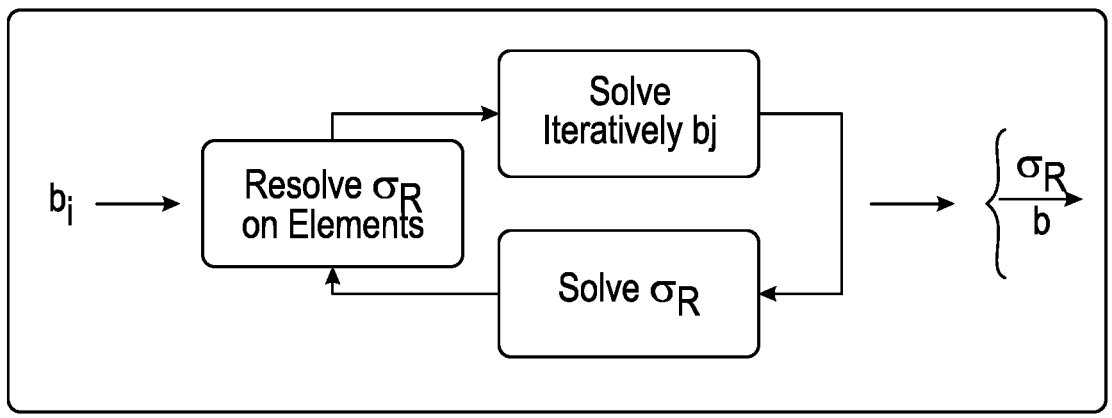
FIGS. 4A-4C depict block diagrams comparing techniques for recovering paleostress, according to one or more embodiments disclosed. More particularly.
Figure 4B:
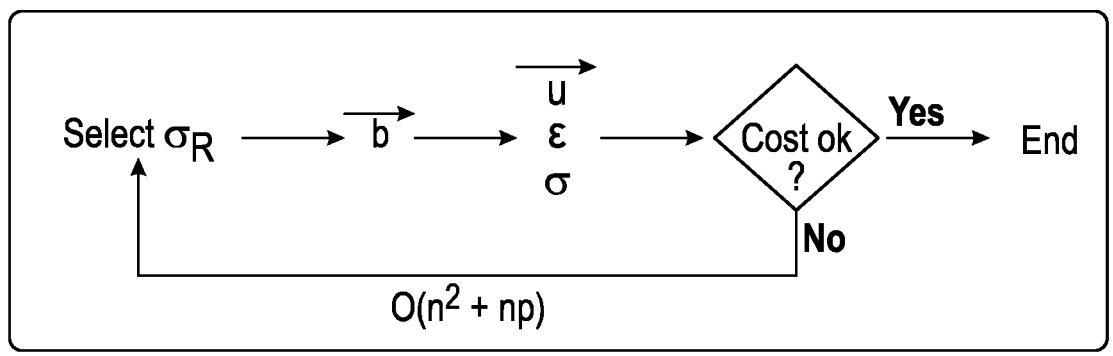
Figure 4C:
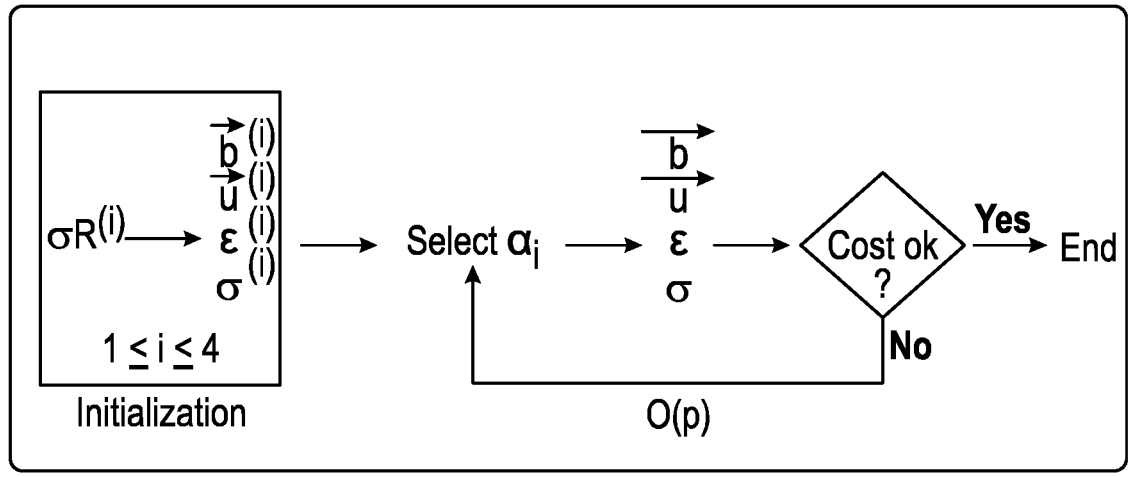

FIG. 4 shows various methods for recovering paleostress, according to one or more embodiments disclosed. FIG. 4A shows a technique that uses slip distributions on faults as data input, but provides unstable results. The technique of FIG. 4A may not augment the slip distributions with other forms of data input, such as GPS data, and so forth. FIG. 4B shows a (2D) Monte Carlo method, but without the optimization using the principle of superposition. FIG. 4C shows the method described herein, including techniques that utilize the principle of superposition and drastically reduce the complexity of the model. The method shown in FIG. 4C may be implemented by the stress and fracture modeling engine 102. For example, in one implementation the initialization engine 304, through the stress model simulators 306, generates three precomputed models of the far field stress associated with a subsurface volume 202. For each of the three models, the initialization engine 304 precomputes, for example, displacement, strain, and/or stress values. The optimization parameters selector 308 iteratively scales the displacement, strain, and/or stress values for each superpositioned model to minimize a cost at the cost assessment engine 310. The values thus optimized in real-time are used to generate particular results 312.

In one implementation, the three linearly independent far field stress parameters are: (i) orientation toward the North, and (ii) & (iii) the two principal magnitudes. These far field stress parameters are modeled and simulated to generate a set of the variables for each of the three simulated models. Four variables can be used: displacement on a fault, the displacement field at any data point or observation point, a strain tensor at each observation point, and the tectonic stress. The optimization parameters selector 308 selects an alpha for each simulation, i.e., a set of "alphas" for the four simulated stress models to act as changeable optimization parameters for iteratively converging on values for these variables in order to minimize one or more cost functions, to be described below. In one implementation, the optimization parameters selector 308 selects optimization parameters at random to begin converging the scaled strain, stress, and or displacement parameters to lowest cost. When the scaled (substantially optimized) parameters are assessed to have the lowest cost, the scaled strain, stress, and/or displacement parameters can be applied to predict a result, such as a new tectonic stress.

Because the method of FIG. 4C uses precomputed values superpositioned from their respective simulations, the stress and fracture modeling engine 102 can provide results quickly, even in real-time. As introduced above, the stress and fracture modeling engine 102 can quickly recover multiple tectonic events responsible for present conditions of the subsurface volume 202, more quickly discern induced fracturing from preexisting fracturing than conventional techniques, provide real-time parameter estimation as the user varies a stress parameter, and/or rapidly predict fracturing.

While conventional paleostress inversion may apply a full mechanical scenario, the stress and fracture modeling engine 102 improves upon conventional techniques by using multiple types of data. Data sets 302 to be used are generally of two types: those which provide orientation information (such as fractures, secondary fault planes with internal friction angle, and fault striations, etc.), and those which provide magnitude information (such as fault slip, GPS data, InSAR data, etc.). Conventionally, paleostress inversion has been computed using slip measurements on fault planes.

The technique shown in FIG. 4A executes an operation that proceeds in two stages: (i) resolving the initial remote stress tensor $\sigma_R$ onto the fault elements that have no relative displacement data and solving for the unknown relative displacements ($b_j$ in FIG. 4A); and, (ii) using the computed and known relative displacements to solve for $\sigma_R$ (FIG. 4A). An iterative solver is used that cycles between stages (i) and (ii) until convergence.

The technique shown in FIG. 4B is based on a Monte-Carlo algorithm. However, this technique proves to be unfeasible since computation time is lengthy, for which the complexity is $O(n^2+p)$, where n and p are a number of triangular elements modeling the faults and the number of data points, respectively. For a given simulation, a random far field stress $\sigma_R$ is chosen, and the corresponding displacement discontinuity $\bar{u}$ on faults is computed. Then, as a post-process at data points, and depending on the type of measurements, cost functions are computed using either the displacement, strain, or stress field. In this scenario, for hundreds of thousands of simulations, the best cost (close to zero) is retained as a solution.

On the other hand, the method diagrammed in FIG. 4A, which can be executed by the stress and fracture modeling engine 102, extends inversion for numerous kinds of data, and provides a much faster modeling engine 102. For example, a resulting fast and reliable stress inversion is described below. The different types of data can be weighted and combined together. The stress and fracture modeling engine 102 can quickly recover the tectonic events and fault pressure as well as displacement discontinuity on faults using diverse data sets and sources, and then obtain an estimate of the displacement and perturbed strain and stress field anywhere within the medium, using data available from seismic interpretation, wellbores, and field observations. Applying the principle of superposition allows a user to execute parameters estimation in a very fast manner.

A numerical technique for performing the methods is described next. Then, a reduced remote tensor used for simulation is described, and then the principle of superposition itself is described. An estimate of the complexity is also described.

In one implementation, a formulation applied by the stress and fracture modeling engine 102 can be executed using IBEM3D, a successor of POLY3D. POLY3D is described by F. Maerten, P. G. Resor, D. D. Pollard, and L. Maerten, *Inverting for slip on three-dimensional fault surfaces using angular dislocations*, Bulletin of the Seismological Society of America, 95:1654-1665, 2005, and by A. L. Thomas, Poly3D: *a three-dimensional, polygonal element, displacement discontinuity boundary element computer program with applications to fractures, faults, and cavities in the earth's crust*, Master's thesis, Stanford University, 1995. IBEM3D is a boundary element code based on the analytical solution of an angular dislocation in a homogeneous or inhomogeneous elastic whole- or half-space. An iterative solver can be employed for speed considerations and for parallelization on multi-core architectures. (See, for example, F. Maerten, L. Maerten, and M. Cooke, *Solving 3d boundary element problems using constrained iterative approach*, Computational Geosciences, 2009.) However, inequality constraints may not be used as they are nonlinear and the principle of superposition does not apply. In the selected code, faults are represented by triangulated surfaces with discontinuous displacement. The three-dimensional fault surfaces can more closely approximate curvi-planar surfaces and curved tip-lines without introducing overlaps or gaps.

Mixed boundary conditions may be prescribed, and when traction boundary conditions are specified, the initialization engine 304 solves for unknown Burgers's components. After the system is solved, it is possible to compute anywhere, within the whole- or half-space, displacement, strain, or stress at observation points, as a post-process. Specifically, the stress field at any observation point is given by the perturbed stress field due to slipping faults plus the contribution of the remote stress. Consequently, obtaining the perturbed stress field due to the slip on faults is not enough. Moreover, the estimation of fault slip from seismic interpretation is given along the dip-direction. Nothing is known along the strike-direction, and a full mechanical scenario is used to recover the unknown components of the slip vector as it will impact the perturbed stress field. Changing the imposed far field stress (orientation and or relative magnitudes) modifies the slip distribution and consequently the perturbed stress field. In general, a code such as IBEM3D is well suited for computing the full displacement vectors on faults, and has been intensively optimized using an H-matrix technique. The unknown for purposes of modeling remains the estimation of the far field stress that has to be imposed as boundary conditions.

In one embodiment, which may be implemented by the stress and fracture modeling engine 102, a model composed of multiple fault surfaces is subjected to a constant far field stress tensor $\sigma_R$ defined in the global coordinate system by Equation (1):

$$\sigma_R = \begin{bmatrix} a_{11} & a_{12} & a_{13} \\ & a_{22} & a_{23} \\ & & a_{33} \end{bmatrix} \quad (1)$$

Assuming a sub-horizontal far field stress (but the present methodology is not restricted to that case), Equation (1) simplifies into Equation (2):

$$\sigma_R = \begin{bmatrix} a_{11} & a_{12} & 0 \\ & a_{22} & 0 \\ & & a_{33} \end{bmatrix} \quad (2)$$

Since the addition of a hydrostatic stress does not change $\sigma_R$, the far field stress tensor $\sigma_R$ can be written as in Equation (3):

$$\sigma_R = \begin{bmatrix} a_{11} & a_{33} & a_{12} & 0 \\ & a_{22} & a_{33} & 0 \\ & & & 0 \end{bmatrix} = \begin{bmatrix} \bar{a}_{11} & \bar{a}_{12} \\ & \bar{a}_{22} \end{bmatrix} \quad (3)$$

Consequently, a definition of a far field stress with three unknowns is obtained, namely $\{\bar{a}_{11}, \bar{a}_{22}, \bar{a}_{12}\}$.

The far field stress tensor, as defined in Equation (3) can be computed using two parameters instead of the three $\{\bar{a}_{11}, \bar{a}_{22}, \bar{a}_{12}\}$. Using spectral decomposition of the reduced $\sigma_R$, Equation (4) may be obtained:

$$\sigma_R = R_\theta^T \sigma R_\theta \quad (4)$$

where, as in Equation (5):

$$\sigma_R = \begin{bmatrix} \sigma_1 & 0 \\ & \sigma_2 \end{bmatrix} \quad (5)$$

the far field stress tensor $\sigma_R$ is the matrix of principal values, and in Equation (6):

$$R_\theta = \begin{bmatrix} \cos\theta & \sin\theta \\ \sin\theta & \cos\theta \end{bmatrix} \quad (6)$$

is the rotation matrix around the global z-axis (since a sub-horizontal stress tensor is assumed).

By writing, in Equation (7):

$$\sigma_2 = k\sigma_1 \quad (7)$$

Equation (4) then transforms into Equation (8):

$$\sigma_R(\theta, k) = \sigma_1 R_\theta^T \begin{bmatrix} 1 & 0 \\ 0 & k \end{bmatrix} R_\theta \quad (8)$$

Omitting the scaling parameter $\sigma_1$ due to Property 1 discussed below (when $\sigma_1 = \delta$ in Property 1), $\sigma_R$ can be expressed as a functional of two parameters $\delta$ and $k$, as in Equation (9):

$$\sigma_R(\theta, k) = R_\theta^T \begin{bmatrix} 1 & 0 \\ 0 & k \end{bmatrix} R_\theta \quad (9)$$

These two parameters are naturally bounded by Equations (10):

$$\begin{cases} \pi/2 \leq \theta \leq \pi \\ 10 \leq k \leq 10 \end{cases} \quad (10)$$

assuming that uniaxial remote stress starts to occur when $k \geq 10$. For $k=1$, a hydrostatic stress tensor is found, which has no effect on the model. Also, using a lithostatic far field stress tensor (which is therefore a function of depth z) does not invalidate the presented technique, and Equation (9) transforms into Equation (11):

$$\sigma_R(\theta, k, z) = z R_\theta^T \begin{bmatrix} 1 & 0 \\ 0 & k \end{bmatrix} R_\theta \quad (11)$$

which is linearly dependent on z. The simplified tensor definition given by Equation (9) is used in the coming sections to determine $\theta$, $k$, or equivalently $\{\bar{a}_{11}, \bar{a}_{22}, \bar{a}_{12}\}$ according to measurements.

Even when 3-dimensional parameter-space is used for the Monte-Carlo simulation using $(\theta, k, p)$, where p is the fault pressure, three components are still used for the far field stress, specified by the parameters $(\alpha_1, \alpha_2, \alpha_3, \alpha_4)$. The conversions are given by Expression (12):

$$(\theta, k)(\sigma_{00}, \sigma_{01}, \sigma_{11})(\alpha_1, \alpha_2, \alpha_3) \quad (12)$$

where, in Equations (13):

$$\begin{cases} \sigma_{00} = \cos^2\theta + k\sin^2\theta \\ \sigma_{01} = (k\ 1)\cos\theta\sin\theta \\ \sigma_{11} = \cos^2\theta + k\sin^2\theta \end{cases} \quad (13)$$

and $(\alpha_1, \alpha_2, \alpha_3)$ are given by Equation (20), further below.

Principle of Superposition

The stress and fracture modeling engine 102 uses the principle of superposition, a well-known principle in the physics of linear elasticity, to recover the displacement, strain, and stress at any observation point P using the precomputed specific values from linearly independent simulations. The principle of superposition stipulates that a given value f can be determined by a linear combination of specific solutions.

In the stress and fracture modeling engine 102, recovering a far field stress implies recovering the three parameters $(\alpha_1, \alpha_2, \alpha_3)$. Therefore, the number of linearly independent solutions used is three. In other words, in Equation (14):

$$\begin{aligned} f = F(\sigma) &= F(\alpha_1\sigma^{(1)} + \alpha_2\sigma^{(2)} + \alpha_3\sigma^{(3)}) \\ &= \alpha_1 F(\sigma^{(1)}) + \alpha_2 F(\sigma^{(2)}) + \alpha_3 F(\sigma^{(3)}) \\ &= \alpha_1 f_1 + \alpha_2 f_2 + \alpha_3 f_3 \end{aligned} \quad (14)$$

where $(\alpha_1, \alpha_2, \alpha_3)$ are real numbers, and $\sigma^{(i)}$ (for i=1 to 3) are three linearly independent remote stress tensors. If F is selected to be the strain, stress or displacement Green's functions, then the resulting values $\varepsilon$, $\sigma$, and u, at P can be expressed as a combination of three specific solutions, as shown below. Thus, the strain, stress and displacement field for a tectonic loading are a linear combination of the three specific solutions, and are given by Equation (15):

$$\begin{cases} \varepsilon_P = \alpha_1 \varepsilon_P^{(1)} + \alpha_2 \varepsilon_P^{(2)} + \alpha_3 \varepsilon_P^{(3)} \\ \sigma_P = \alpha_1 \sigma_P^{(1)} + \alpha_2 \sigma_P^{(2)} + \alpha_3 \sigma_P^{(3)} \\ u_P = \alpha_1 u_P^{(1)} + \alpha_2 u_P^{(2)} + \alpha_3 u_P^{(3)} \end{cases} \quad (15)$$

Similarly, using $(\alpha_1, \alpha_2, \alpha_3)$ allows recovery of the displacement discontinuities on the faults, as in Equation (16):

$$b_e = \alpha_1 b_e^{(1)} + \alpha_2 b_e^{(2)} + \alpha_3 b_e^{(3)} \quad (16)$$

and any far field stress is also given as a combination of the three parameters, as in Equation (17):

$$\sigma_R = \alpha_1 \sigma_R^{(1)} + \alpha_2 \sigma_R^{(2)} + \alpha_3 \sigma_R^{(3)} \quad (17)$$

Complexity Estimate

The entire model is oftentimes recomputed to change $\sigma_R$ to determine the corresponding unknown displacement discontinuities. Then, at any observation point P, the stress is determined as a superimposition of the far field stress $\sigma_R$ and the perturbed stress field due to slipping elements.

For a model made of n triangular discontinuous elements, computing the stress state at point P first involves solving for the unknown displacement discontinuities on triangular elements (for which the complexity is $O(n^2)$, and then performing approximately 350 n multiplications using the standard method. By using the principle of superposition, on the other hand, the unknown displacement discontinuities on triangular elements do not have to be recomputed, and many fewer (e.g., 18) multiplications are performed by the stress and fracture modeling engine 102. The complexity is independent of the number of triangular elements within the model, and is constant in time.

Some direct applications of the methods will now be described, such as real-time evaluation of deformation and the perturbed stress field while a user varies a far field stress parameter. Paleostress estimation using different data sets 302 is also presented further below, as is a method to recover multiple tectonic phases, and a description of how the example method can be used for quality control during fault interpretation.

Real-Time Computation

Before describing the paleostress inversion method, another method is described first, for real-time computing displacement discontinuity on faults, and the displacement, strain, and stress fields at observation points while the orientation and/or magnitude of the far field stress is varied.

If the tectonic stress $\sigma_R$ is given and three independent solutions are known, there exists a unique triple $(\alpha_1, \pi_2, \alpha_3)$ for which Equation (17) is honored, and Equations (15) and (16) can be applied.

In matrix form, Equation (17) is written in the format shown in Equation (18):

$$\begin{bmatrix} \sigma_{00}^{(1)} & \sigma_{00}^{(2)} & \sigma_{00}^{(3)} \\ \sigma_{01}^{(1)} & \sigma_{01}^{(2)} & \sigma_{01}^{(3)} \\ \sigma_{11}^{(1)} & \sigma_{11}^{(2)} & \sigma_{11}^{(3)} \end{bmatrix} \begin{Bmatrix} \alpha_1 \\ \alpha_2 \\ \alpha_3 \end{Bmatrix} = \begin{Bmatrix} \sigma_{00}^R \\ \sigma_{01}^R \\ \sigma_{11}^R \end{Bmatrix} \qquad (18)$$

or, in compact form, as in Equation (19):

$$A_\sigma \alpha = \sigma_R \qquad (19)$$

Since the three particular solutions $\sigma^{(i)}$ are linearly independent, the system can be inverted, which gives Equation (20):

$$\alpha = A_\sigma^{-1} \sigma_R \qquad (20)$$

In Equation (20), $A_\sigma^{-1}$ is precomputed by the initialization engine 304. Given a user-selected remote stress, $\sigma_R$, the stress and fracture modeling engine 102 recovers the three parameters $(\alpha_1, \alpha_2, \alpha_3)$, then the fault slip and the displacement, strain and stress field are computed in real-time using Equations (16) and (15), respectively. To do so, the three particular solutions of the displacement, strain and stress are stored at initialization at each observation point, as well as the displacement discontinuity on the faults. In one implementation, the example stress and fracture modeling engine 102 enables the user to vary the orientation and magnitude of $\sigma_R$, and to interactively display the associated deformation and perturbed stress field.

Paleostress Inversion Using Data Sets

As seen above, the main unknowns while doing forward modeling for the estimation of the slip distribution on faults, and consequently the associated perturbed stress field, are the orientation and relative magnitudes of the far field stress $\sigma_R$.

If field measurements are known at some given observation points (e.g., displacement, strain and/or stress, fractures orientation, secondary fault planes that formed in the vicinity of major faults, etc.), then it is possible to recover the triple $(\alpha_1, \alpha_2, \alpha_3)$, and therefore also recover the tectonic stress $\sigma_R$ and the corresponding tectonic regime. The next section describes the method of resolution and the cost functions used to minimize cost for different types of data sets 302.

Method of Resolution

Applying a Monte Carlo technique allows the parameters $(\alpha_1, \alpha_2, \alpha_3)$ to be found, which minimize the cost functions when given three independent far field stresses (see Equation 15). However, even if $(\alpha_1, \alpha_2, \alpha_3)$ imply a 3-dimensional parameters-space, this space can be reduced to two dimensions (namely, to the parameters $\theta$ and k), the conversion being given by Equation (20) and $(\theta, k) \rightarrow (\sigma_{00}, \sigma_{01}, \sigma_{11}) \rightarrow (\alpha_1, \alpha_2, \alpha_3)$, where, in Equations (21):

$$\begin{cases} \sigma_{00} = \cos^2 \theta + k \sin^2 \theta \\ \sigma_{01} = (k\ 1)\cos \theta \sin \theta \\ \sigma_{11} = \cos^2 \theta + k \sin^2 \theta \end{cases} \qquad (21)$$

(see also FIG. 4-3 and Algorithm 1 for a detailed description). Consequently, the searching method (e.g., the search for optimized parameters) is accelerated by reducing the parameters-space by one dimension.

A simple sampling method can be performed by considering a two-dimensional rectangular domain for which the axes correspond to $\theta$ and k. The 2D-domain is sampled randomly with $n_p$ points, and the associated cost function (to be defined in the coming sections) is used to determine the point of minimum cost. A refinement is then created around the selected point and the procedure is repeated with a smaller domain. Algorithm (1) depicts a simplified version of the procedure, for which there is no refinement. The example sampling method presented here can be greatly optimized by various techniques.

---

ALGORITHM (1): Paleostress Estimation

---

Input: Faults geometry
Input: Data set
Output: $\sigma_R$ // the estimated paleostress
Initialize: Compute 3 simulations using 3 linearly independent $\sigma_R^{(i)}$ ($1 \le i \le 3$) and the faults geometry.
Store the resulting displacement and stress fields at data points, and the displacement discontinuity at faults, if necessary.
Let c = 1 // initial cost
Let $\alpha$ = (0,0,0) // initial ($\alpha$) solution
for i = 1 to $n_p$ do Randomly generate $\theta \in \left[\frac{\pi}{2}, \frac{\pi}{2}\right]$ Randomly generate k $\in$ [10,10]
    // Convert $(\theta, k) \in {}^2$ to $(\alpha) \in {}^3$
    Compute $R_\theta$ using Equation (6)
    Compute $\sigma_R(\theta, k)$ using Equation (9)
    Compute $\alpha$ using Equation (20)
    // Compute the corresponding cost
    d = cost ($\alpha$, data set)
    if d $\le$ c then
        $\bar{\alpha} = \alpha$
        c = d
    end
end $$\sigma_R = \Sigma_{i=1}^3 \bar{\alpha}_i \sigma_R^i$$

A Second Formulation of the Monte-Carlo 2D Domain

Other formulations of the Monte-Carlo 2D Domain may be used without departing from the scope of the claims. For example, below is another formulation that may be used.

In the formulation below, θ is defined as a value between 0 and π, rather than between π/2 and π/2. Further, θ=0 corresponds to the north and the angle is defined clockwise.

Equation (2) above may be changed to the following Equation (2'):

$$\sigma_R = R_{\theta,\varphi,\Psi} \begin{bmatrix} \sigma_h & & \\ & \sigma_H & \\ & & \sigma_v \end{bmatrix} R_{\theta,\varphi,\Psi}^T \quad (2')$$

Equation (3) above may be changed to the following Equation (3'), where $R_\theta$ is the rotation matrix along the vertical axis (clockwise) with $\theta \in [0, \pi]$:

$$\sigma_R = R_\theta \begin{bmatrix} \sigma_h & \sigma_v & \\ & \sigma_H & \sigma_v \end{bmatrix} R_\theta^T \quad (3')$$

Using the second formulation, the definition of a regional stress has three unknowns, namely ($\sigma_h$ $\sigma_v$), ($\sigma_H$ $\sigma_v$), and θ. Expressing (2') using $\sigma_1$, $\sigma_2$ and $\sigma_3$ for the three Andersonian fault regimes (Anderson, 1905), factorizing with ($\sigma_1-\sigma_3$) and introducing the stress ratio, R=($\sigma_2-\sigma_3$)/($\sigma_1-\sigma_3$)$\in$[0,1], the following Equation (22) results as follows:

$$\sigma_R = \begin{cases} (\sigma_1\ \sigma_3)R_\theta \begin{bmatrix} 1 & \\ & R & 1 \end{bmatrix} R_\theta^T & \text{for Normal fault regime} \\ (\sigma_1\ \sigma_3)R_\theta \begin{bmatrix} R & \\ & 1 & R \end{bmatrix} R_\theta^T & \text{for Wrench fault regime} \\ (\sigma_1\ \sigma_3)R_\theta \begin{bmatrix} R & \\ & 1 \end{bmatrix} R_\theta^T & \text{for Thrust fault regime} \end{cases} \quad (22)$$

By changing R to R' as shown in equation (23) as follows, a unique stress shape parameter R' is created for the three fault regimes together:

$$R' \in [1, 3] = \begin{cases} R & \in [0, 1] & \text{for Normal fault regime} \\ 2\ R & \in [1, 2] & \text{for Wrench fault regime} \\ 2+R & \in [2, 3] & \text{for Thrust fault regime} \end{cases} \quad (23)$$

Omitting the scaling factor ($\sigma_1\sigma_3$), the regional stress tensor in (23) is defined with only two parameters, θ and R'. This definition may be used as shown below to determine (θ, R') according to the data utilized.

Continuing with the second formulation, Equation (7) above is not used. Further, Equation 10 is replaced with the following equation (10'):

$$\begin{cases} 0 \leq \theta \leq \pi \\ 0 \leq R' \leq 3 \end{cases} \quad (10')$$

Equation (12) becomes Equation (12') as follows:

$$(\theta, R') \rightarrow (\sigma_{00}, \sigma_{01}, \sigma_{11}) \rightarrow (\alpha_1, \alpha_2, \alpha_3) \quad (12')$$

Further, equations (13) and (21) are replaced by:

$$\begin{cases} \sigma_{00} = \sin \beta \cos \beta \cos^2 \theta \\ \sigma_{01} = \cos \beta \sin \theta \cos \theta \\ \sigma_{00} = \sin \beta \cos \beta \sin^2 \theta \end{cases} \quad (13')$$

with β being an angle defined as:

$$\beta = \tan^{-1}\left(\frac{R'-1}{R'}\right) \text{ for normal fault regime}$$

$$\beta = \tan^{-1}(R'\ 1) \text{ for strike slip fault regime}$$

$$\beta = \tan^{-1}\left(\frac{1}{3-R'}\right) \text{ for thrust fault regime}$$

Further, Algorithm (1) may be changed to the following Algorithm (1'):

---

ALGORITHM (1'): Paleostress Estimation

Input: Faults geometry
Input: Data set
Output: $\sigma_R$ // the estimated paleostress
Initialize: Compute 3 simulations using 3 linearly independent $\sigma_R^{(i)}$ ($1 \leq i \leq 3$) and the faults geometry. Store the resulting displacement and stress fields at data points, and the displacement discontinuity at faults,
if necessary.
Let c = 1 // initial cost
Let α = (0,0,0,) // initial (α) solution
for i = 1 to $n_p$ do
   Randomly generate θ ε [0, π]
   Randomly generate R' ε [0,3]
   // Convert (θ, R') ε $^2$ to α ε $^3$
   Compute $\sigma_R$ (θ, R') using equation (13')
   Compute α using equation (20)
   // Compute the corresponding cost
   d = cost(α, data set)
   if d ≤ c then
      $\overline{\alpha} = \alpha$
      c = d
   end
end $$\sigma_R = \sum_{i=1}^{3} \overline{\alpha}_i \sigma_R^i$$

---

While the above discussion presents a second formulation, other formulations may be used without departing from the scope of the claims.

Data Sets

The particularity of this method lies in a fact that many different kinds of data sets 302 can be used to constrain the inversion. Two groups of data are presented in the following sections: the first one includes orientation information and the second includes displacement and/or stress magnitude information.

Without Magnitude Information from the Data Set

For opening fractures (e.g., joints, veins, dikes) the orientation of the normal to the fracture plane indicates the direction of the least compressive stress direction in 3D ($\sigma_3$). Similarly, the normals to pressure solution seams and stylolites indicate the direction of the most compressive stress ($\sigma_1$). Using measurements of the orientations of fractures, pressure solution seams, and stylolites allows the stress and fracture modeling engine 102 to recover the tectonic regime which generated such features.

Figure 5A:
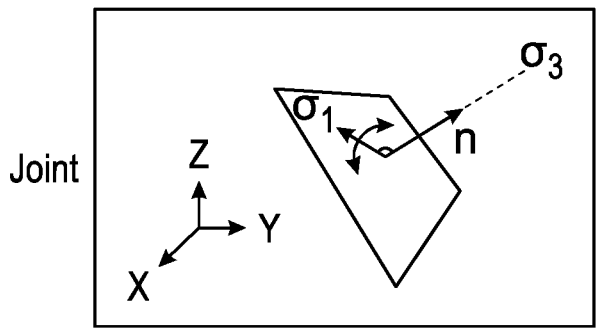
FIGS. 5A-5E depict diagrams of an illustrative method applied to fracture and conjugate fault planes using data sets without magnitude information, according to one or more embodiments disclosed. More particularly.
Figure 5B:
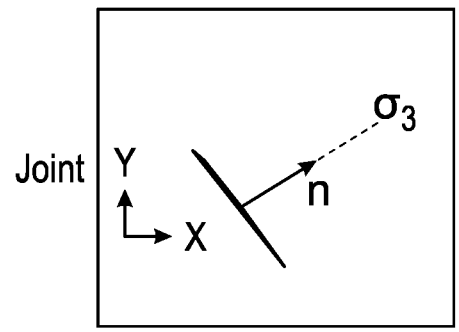
Figure 5C:
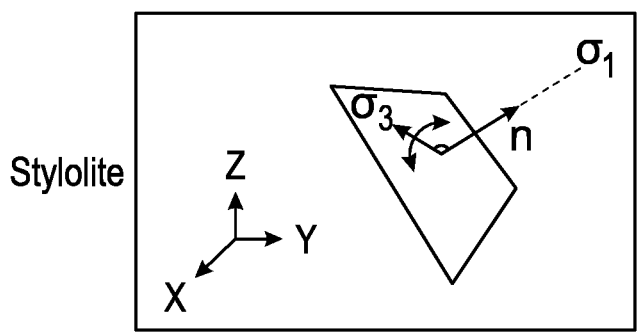
Figure 5D:
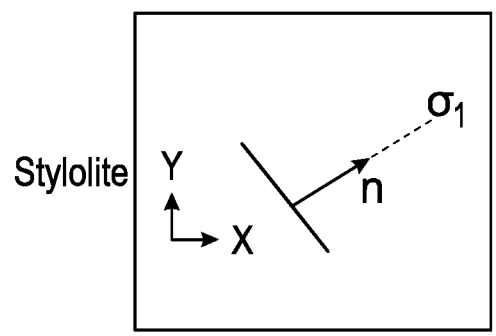
Figure 5E:
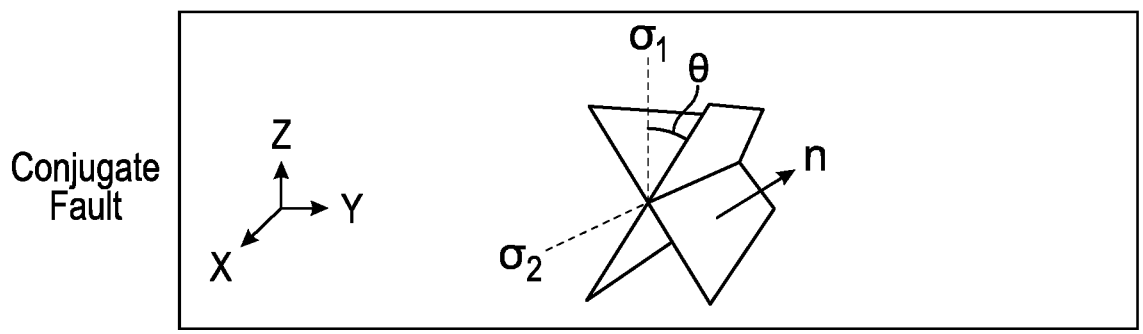

At any observation point P, the local perturbed stress field can be determined from a numerical point of view by using three linearly independent simulations. FIG. 5 shows fracture and conjugate fault planes, according to one or more embodiments disclosed. FIG. 5A shows orientation of $\sigma_3$ relative to an opening fracture (joints, veins, dikes) given by its normal $\bar{n}$ in 3D. FIG. 5B shows the same as FIG. 5A, except for an orientation of $\sigma_3$ relative to a joint given by its projected normal $\bar{n}$ (e.g., trace on outcrop). FIG. 5C and FIG. 5D show the same as FIG. 5A and FIG. 5B, except shown for a stylolite. FIG. 5E shows orientation of $\sigma_2$ and $\sigma_1$ relative to conjugate fault-planes given by one of the normal $\bar{n}$ in 3D and the internal friction angle θ. The goal is to determine the best fit of the far field stress $\sigma_R$, and therefore parameters ($\alpha_1$, $\alpha_2$, $\alpha_3$), given some orientations of opening fracture planes for which the normals coincide with the directions of the least compressive stress $\sigma_3^P$ at P, or equivalently for which the plane of the fracture contains the most compressive stress ($\sigma_1$), as in FIG. 5A and FIG. 5B.

By varying ($\alpha_1$, $\alpha_2$, $\alpha_3$), the state of stress at any observation point P can be computed quickly using the three precomputed models. The cost function to minimize is given in Equation (24):

$$f_{frac}(\alpha_1, \alpha_2, \alpha_3) = \frac{1}{2m}\sum_P ((\bar{\sigma}_1^P \cdot \bar{n}^P)^2 + (\sigma_2^P \cdot \bar{n}^P)^2)^{1/2} \quad (24)$$

where "·" is the dot-product, $\bar{n}$ is the normal to a fracture plane, and m is the number of observation points. The minimization of a function of the three parameters is expressed by Equation (25):

$$F_{frac} = \min_{\alpha_1,\alpha_2,\alpha_3}\{f_{frac}(\alpha_1, \alpha_2, \alpha_3)\} \quad (25)$$

Similarly, for pressure solution seams and stylolites, the cost function is defined as in Equation (22) using the least compressive stress $\sigma_3$ as in Equation (26) (see FIG. 5-3 and FIG. 5-4):

$$f_{styl}(\alpha_1, \alpha_2, \alpha_3) = \frac{1}{2m}\sum_P ((\sigma_3^P \cdot \bar{n}^P)^2 + (\sigma_2^P \cdot \bar{n}^P)^2)^{1/2} \quad (26)$$

Using Secondary Fault Planes

The orientation of secondary fault planes that develop in the vicinity of larger active faults may be estimated using a Coulomb failure criteria, defined by Equation (27):

$$\tan(2\theta) = 1/\mu \quad (27)$$

where θ is the angle of the failure planes to the maximum principal compressive stress $\sigma_1$ and μ is the coefficient of internal friction. Two conjugate failure planes intersect along $\sigma_2$ and the fault orientation is influenced by the orientation of the principal stresses and the value of the friction.

The cost function is therefore defined by Equation (28):

$$f_{fault}(\alpha_1, \alpha_2, \alpha_3) = \frac{1}{2m}\sum_P \left[(\sigma_2^P \cdot \bar{n}^P)^2 + \left(\frac{|\sin^{-1}(\bar{\sigma}_1^P \cdot \bar{n}^P)| - \theta}{\pi}\right)^2\right]^{1/2} \quad (28)$$

where $\sigma_1$ is the direction of the most compressive stress and $\sigma_2$ is the direction of the intermediate principal stress. The first term of the right hand side in Equation (26) maintains an orthogonality between the computed $\sigma_2$ and the normal of the fault plane, whereas the second term ensures that the angle between the computed al and the fault plane is close to θ (see FIG. 5-5).

Example: Normal and Thrust Fault

Figure 6A:
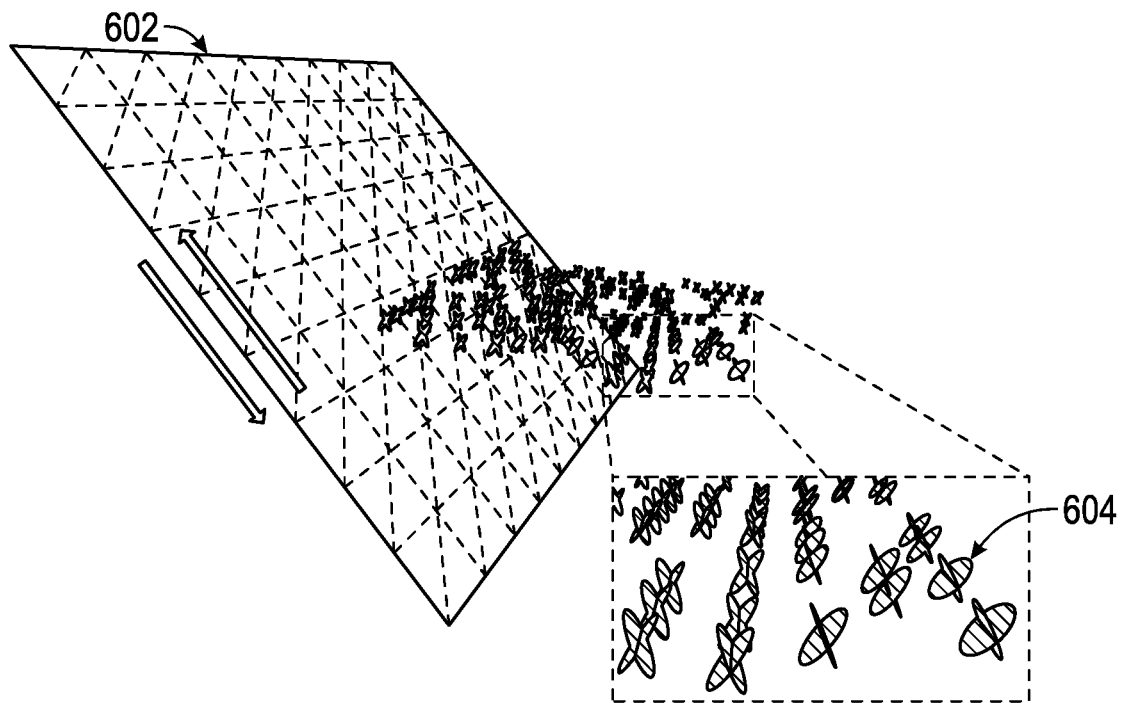
FIGS. 6A and 6B depict diagrams comparing illustrative stress inversion for normal fault and thrust fault configurations, according to one or more embodiments disclosed. More particularly, the inclination of the two conjugate fault planes is presented for a normal fault configuration (FIG. 6A) and a thrust fault configuration (FIG. 6B).
Figure 6B:
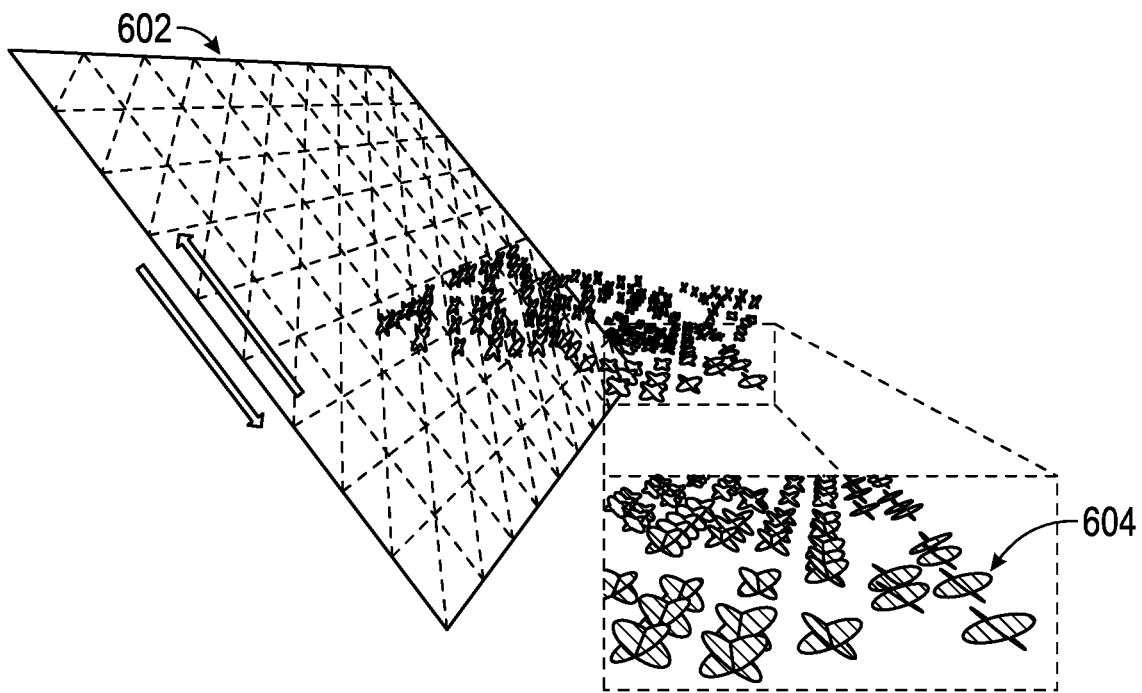

FIG. 6 shows a synthetic example using an inclined planar fault as one of two conjugate fault planes selected randomly, according to one or more embodiments disclosed. The inclination of the two conjugate fault planes is presented for a normal fault configuration (FIG. 6A) and a thrust fault configuration (FIG. 6B). Dip-azimuth and dip-angle of each conjugate fault plane are used to perform the inversion and the internal friction angle is θ=30. The main active fault is represented by the inclined rectangular plane 602.

Initially, the model is constrained by a far field stress at some observation points 604, where the two conjugate planes are computed using an internal friction angle of 30 degrees. Then, for each observation point 604, one of the conjugate fault planes is chosen randomly and used as input data for the stress inversion.

Figure 7A:
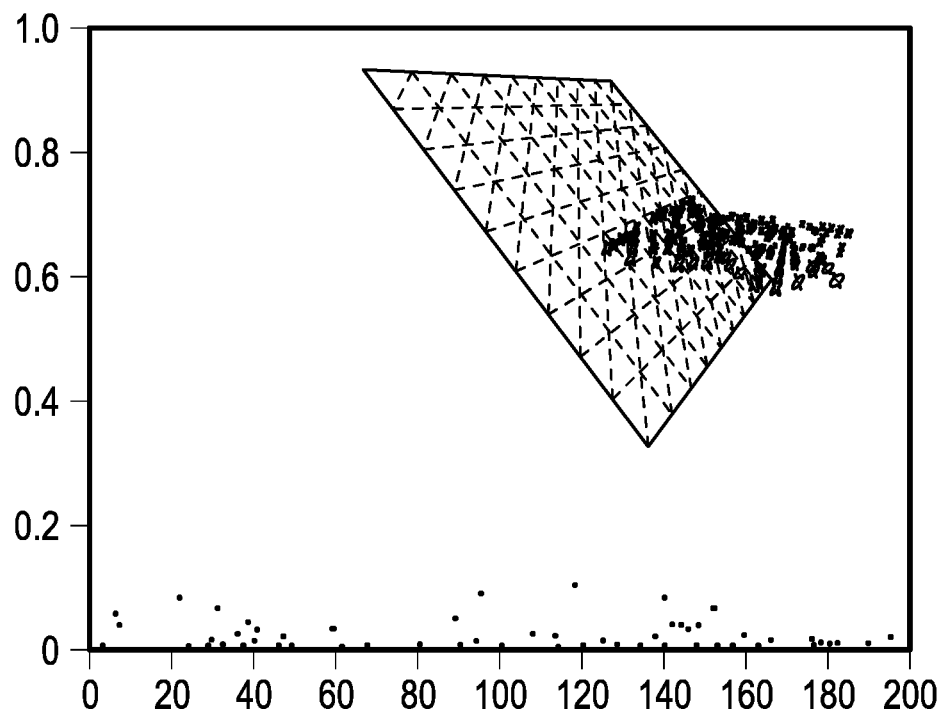
FIGS. 7A and 7B depict diagrams of cost functions for the stress inversions of FIG. 6, according to one or more embodiments disclosed. More particularly.
Figure 7B:
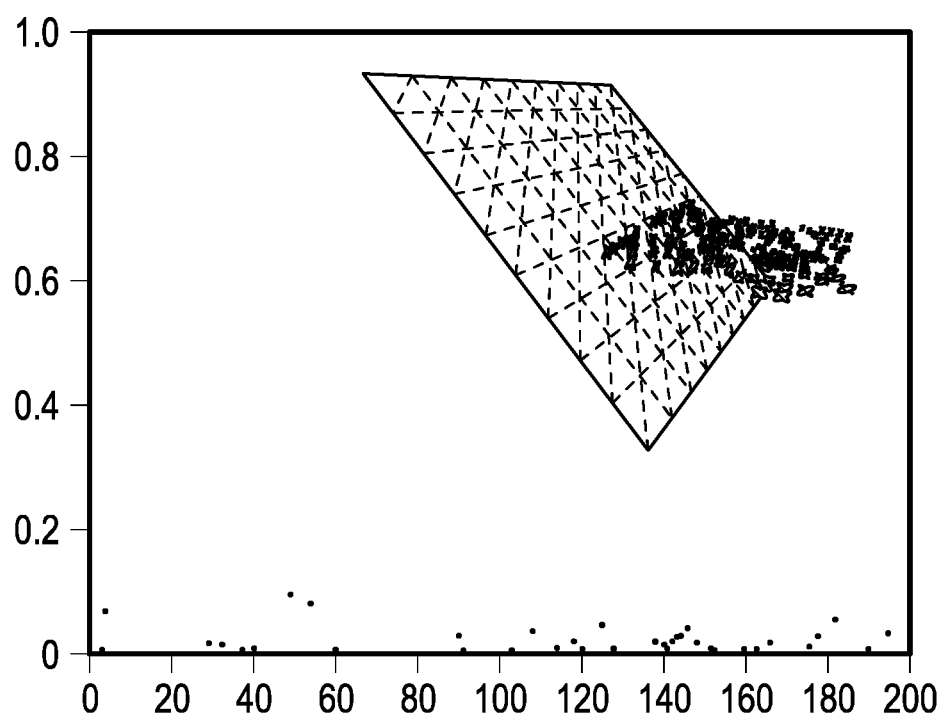

FIG. 7 shows the cost function for the synthetic example from FIG. 6, according to one or more embodiments disclosed. FIG. 7A shows the cost function for the normal fault, and FIG. 7B shows the cost function for the thrust fault. In both cases, the recovered regional stress tensor, displacement on fault, and predicted conjugate fault planes provide a good match with the initial synthetic model.

Using Fault Striations

In the case of fault striations, the cost function is defined as in Equation (29):

$$f_{stri}(\alpha_1, \alpha_2, \alpha_3) = \frac{1}{m}\sum_P (1(1 \quad d_e^c \cdot d_e^m)^2)^{1/2} \quad (29)$$

where $d_e^c$ and $d_e^m$ represent the normalized slip vector from a simulation and the measured slip vector, respectively.

Data Sets Containing Magnitude Information

The magnitude of displacements may be used to determine the stress orientation and the magnitude of the remote stress tensor, instead of just the principal stress ratio.

To do so, the procedure is similar to that described previously. However, given Equations (15) and (16), it is evident that there exists a parameter δ for which the computed displacement discontinuity on faults and the displacement, strain and stress fields at observation points scale linearly with the imposed far field stress. In other words, as in Equation (30):

$$\begin{cases} \delta\sigma_R \Rightarrow \delta b_e \\ \delta\sigma_R \Rightarrow \delta u_P \\ \delta\sigma_R \Rightarrow \delta\varepsilon_P \\ \delta\sigma_R \Rightarrow \delta\sigma_P \end{cases} \quad (30)$$

This leads to the following property:

Property 1: Scaling the far field stress by δ ∈ scales the displacement discontinuity on faults as well as the displacement, strain, and stress fields at observation points by δ.

Using this property, measurements at data points are globally normalized before any computation and the scaling factor is noted (the simulations are also normalized, but the scaling factor is irrelevant). After the system is solved, the recovered far field stress, displacement and stress fields are scaled back by a factor of $\delta_m^{-1}$.

Using GPS Data

In the case of a GPS data set, the cost function is defined in Equation (31):

$$f_{gps}(\alpha_1, \alpha_2, \alpha_3) = \frac{1}{2m}\sum_P\left[\left(1 - \frac{\bar{u}_P^m \cdot \bar{u}_P^c}{\|\bar{u}_P^c\|\|\bar{u}_P^m\|}\right)^2 + \left(1 - \frac{\|\bar{u}_P^m\|}{\|\bar{u}_P^c\|}\right)^2 (\bar{u}_P^c \ \bar{u}_P^m)^2\right]^{1/2} \quad (31)$$

where $\bar{u}_P^m$ is the globally normalized measured elevation changed at point P from the horizon, and $\bar{u}_P^c$ is the globally normalized computed elevation change for a given set of parameters $(\alpha_1, \alpha_2, \alpha_3)$. The first term on the right hand side in Equation (31) represents a minimization of the angle between the two displacement vectors, whereas the second term represents a minimization of the difference of the norm.

Using InSAR Data

When using an InSAR data set, there are two possibilities. Either the global displacement vectors of the measures are computed using the displacement u along the direction of the satellite line of sight s, in which case Equation (32) is used:

$$\bar{u}_P^m = \bar{u}_{insar} = u \cdot s \quad (32)$$

and the same procedure that is used for the GPS data set (above) is applied with the computed $\bar{u}_P^c$, or, the computed displacement vectors are computed along the satellite line of sight, in which case Equation (33) is used:

$$u_P^c = \bar{u} \cdot s \quad (33)$$

where "·" is the dot product. The cost function is consequently given by Equation (34):

$$f_{insar}(\alpha_1, \alpha_2, \alpha_3) = \frac{1}{m}\sum_P\left(1 - \left(\frac{u_P^c}{u_P^m}\right)^2\right)^{1/2} \quad (34)$$

Figure 8:
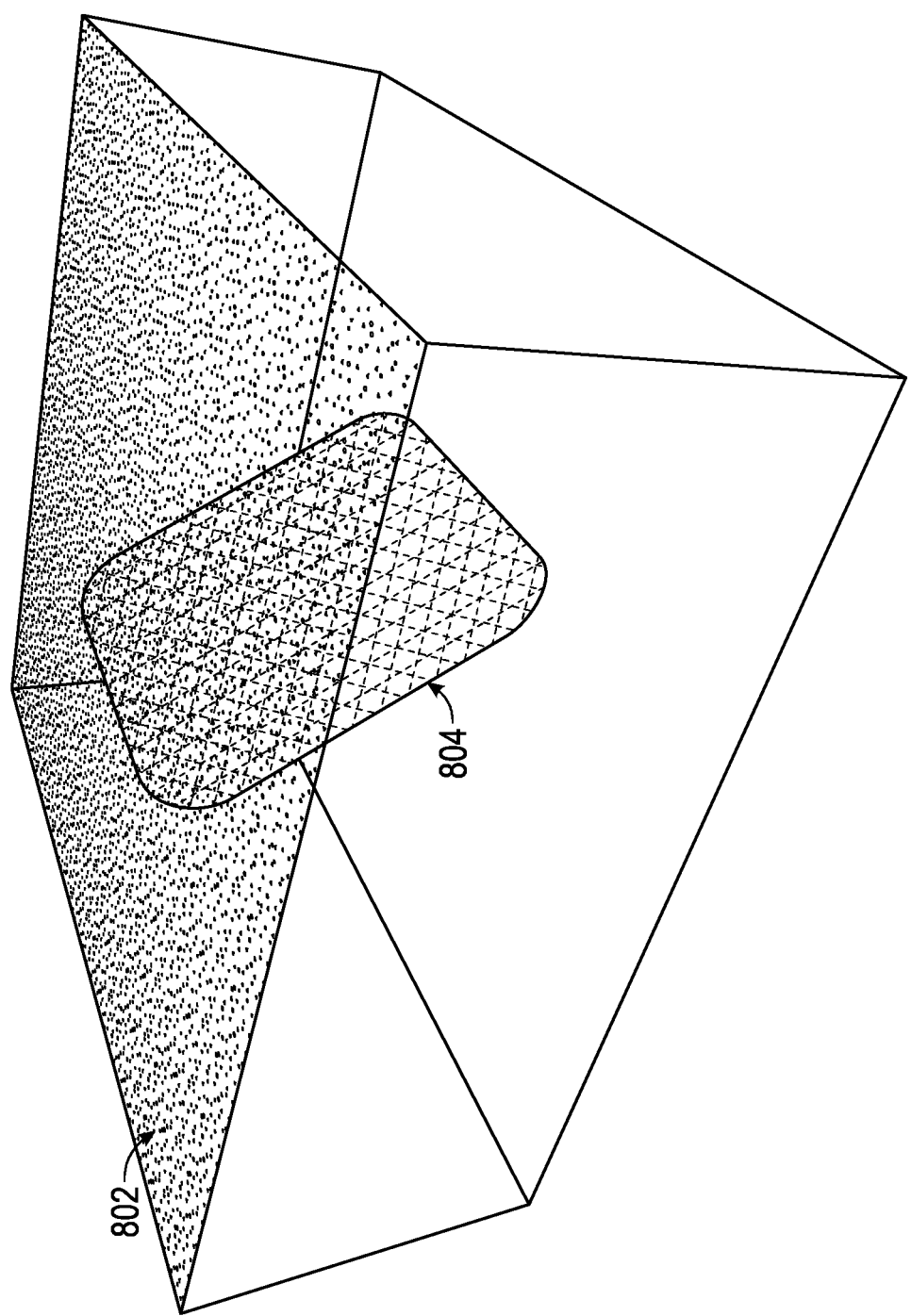
FIG. 8 depicts a diagram of an illustrative model configuration showing InSAR data points and a fault surface, according to one or more embodiments disclosed.
Figure 9:
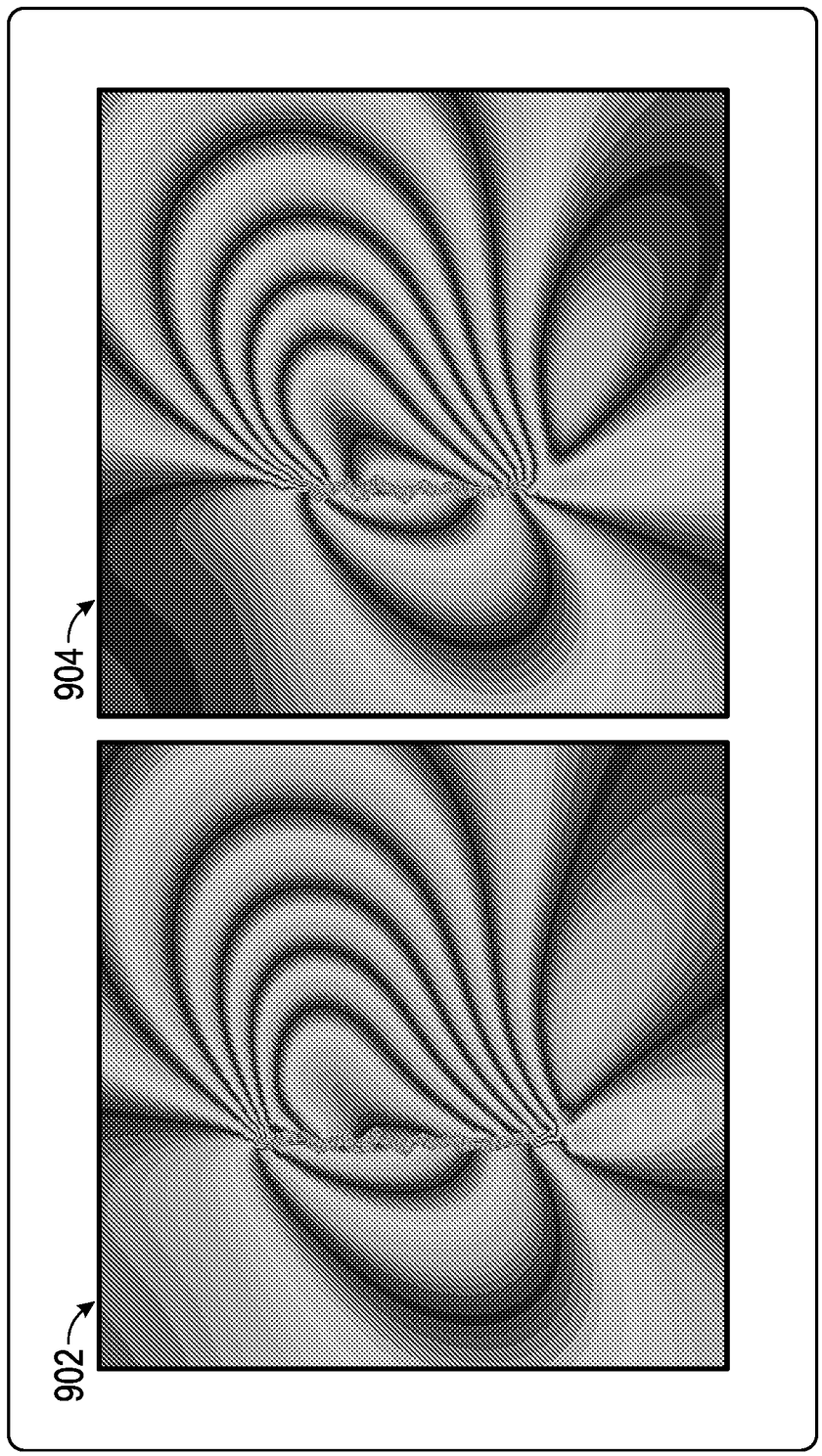
FIG. 9 depicts a diagram comparing fringes from an original InSAR grid and an InSAR grid recovered by an example stress and fracture modeling method using the principle of superposition, according to one or more embodiments disclosed.
Figure 10:
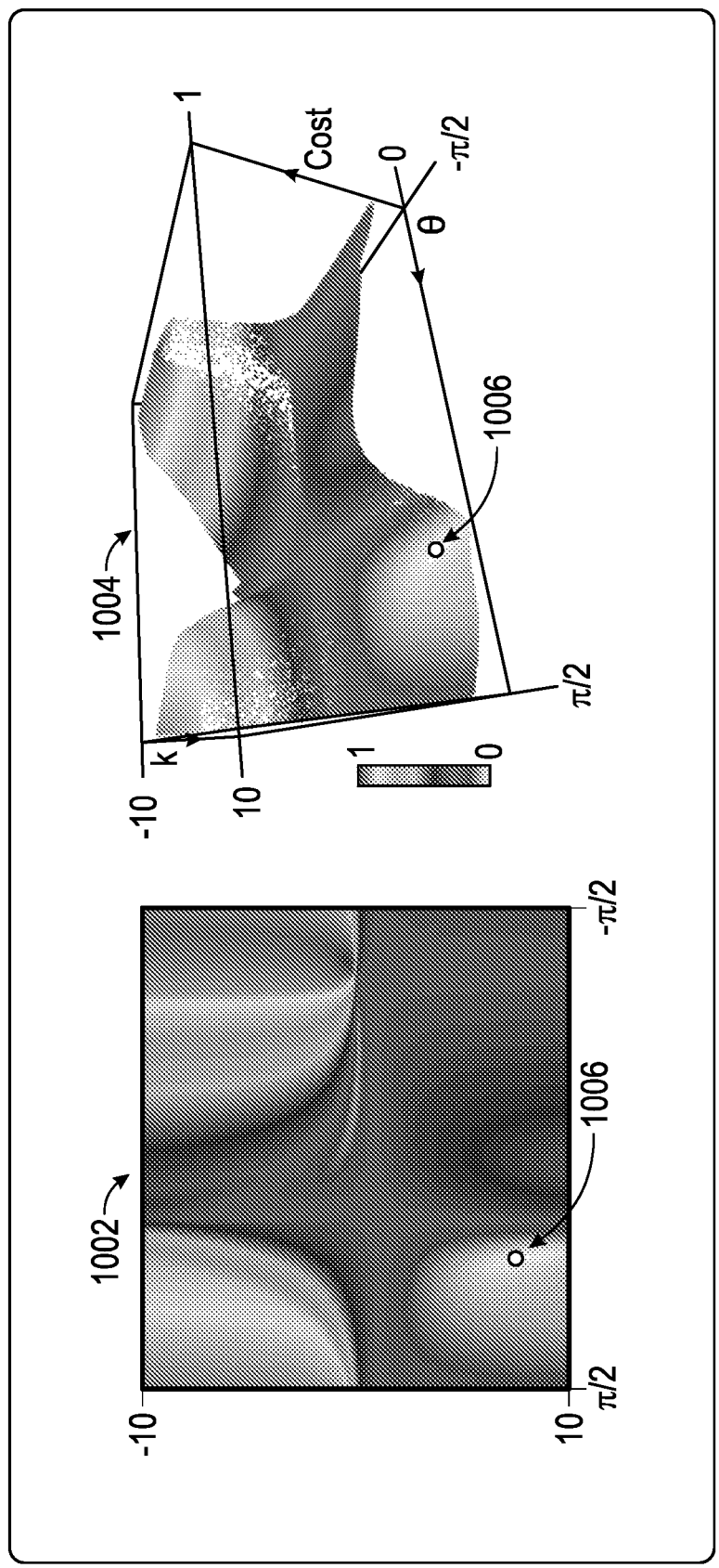
FIG. 10 depicts a diagram showing a top view and a front perspective view of a plot of the cost surface for an example method applied to the InSAR case of FIGS. 8 and 9, with cost solution indicated, according to one or more embodiments disclosed.
Figure 11A:
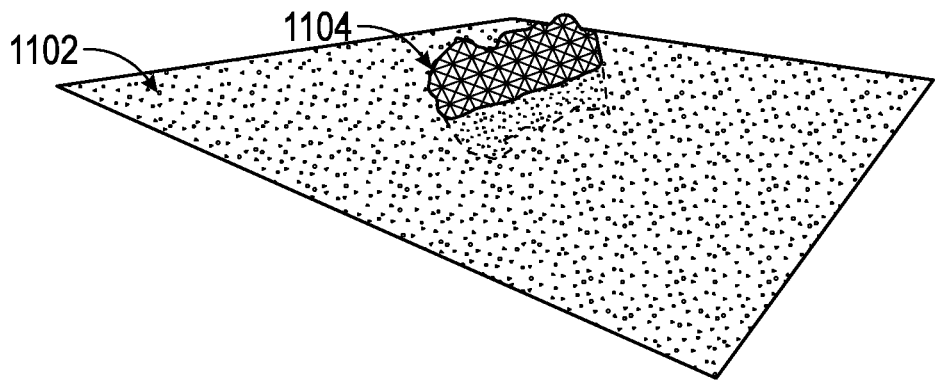
FIGS. 11A-11D depict diagrams showing results of an illustrative method applied to a flattened horizon scenario, according to one or more embodiments disclosed. More particularly.
Figure 11B:
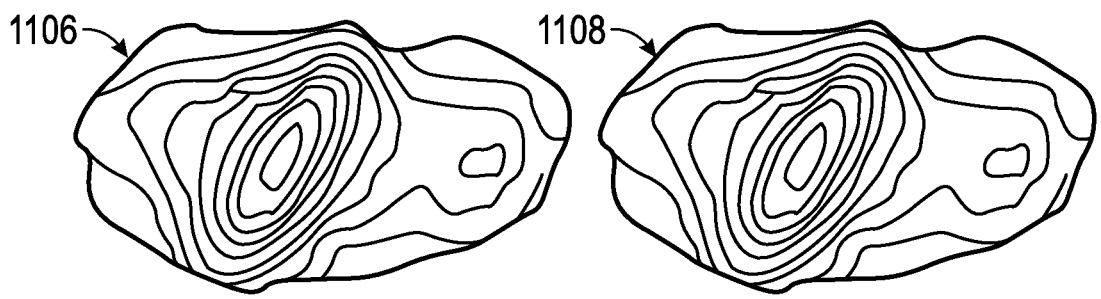
Figure 11C:
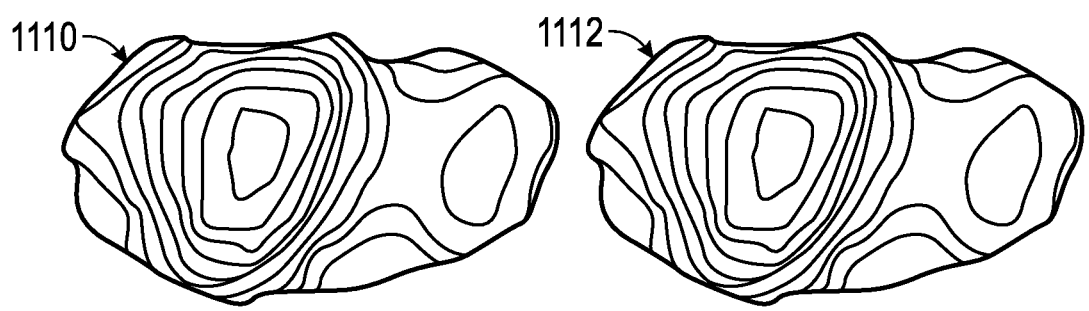
Figure 11D:
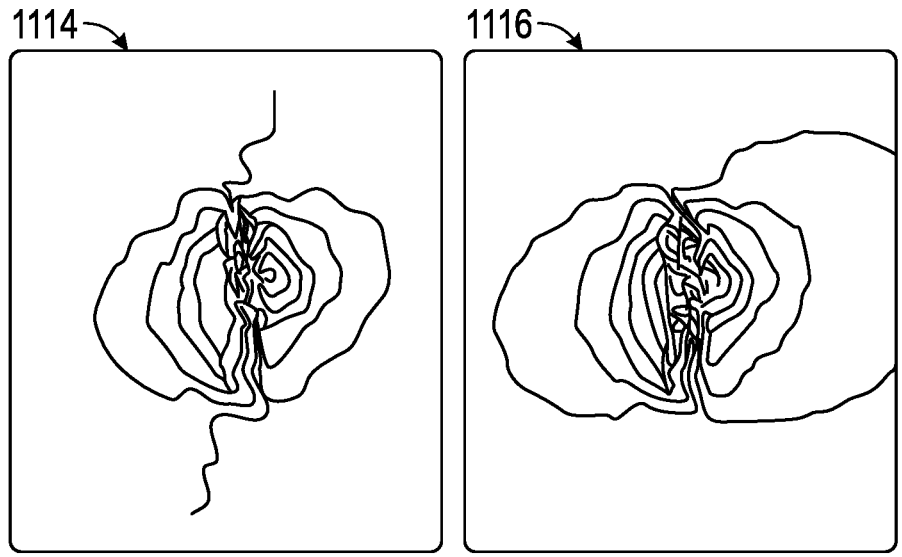

FIGS. 8, 9, and 10 present a synthetic example using an InSAR data set. More particularly, FIG. 8 shows a model configuration showing the InSAR data points 802 as well as the fault surface 804, FIG. 9 shows a comparison of the fringes from the original InSAR grid 902 and the recovered InSAR grid 904, and FIG. 10 shows a plot of the cost surface, as a function of θ (x-axis) and k (y-axis), according to one or more embodiments disclosed. On the left is a top view 1002 of the plot, and on the right is a front perspective view 1004 of the plot. The minimized cost solution 1006 in each view is marked by a small white circle (1006).

To utilize an InSAR data set, a forward model is run using one fault plane 804 and one observation grid (FIG. 8) at the surface of the half-space (see surface holding the data points 802). A satellite direction is selected, and for each observation point 802, the displacement along the satellite line of sight is computed. Then, the stress and fracture modeling method described herein is applied using the second form of the InSAR cost function given in Equation (34). FIG. 9 compares the original interferogram 902 (left) to the recovered interferogram 904 (right). FIG. 10 shows how complex the cost surface can be, even for a simple synthetic model.

In one implementation, the cost surface was sampled with 500,000 data points 802 (number of simulations), and took 18 seconds on an average laptop computer with a 2 GHz processor and with 2 GB of RAM running on Linux Ubuntu version 8.10, 32 bits.

Using a Flattened Horizon

Using the mean plane of a given seismic horizon (flattened horizon), the stress and fracture modeling engine 102 first computes the change in elevation for each point making the horizon. Then, the GPS cost function can used, for which the $u_z$ component is provided, giving Equation (35):

$$f_{horizon}(\alpha_1, \alpha_2, \alpha_3) = \frac{1}{m}\sum_P\left(1 - \left(\frac{u_P^c}{u_P^m}\right)^2\right)^{1/2} \quad (35)$$

If pre- or post-folding of the area is observed, the mean plane can no longer be used as a proxy. Therefore, a smooth and continuous fitting surface has to be constructed which removes the faulting deformations while keeping the folds. Then, the same procedure as for the mean plane can be used to estimate the paleostress. In some circumstances and prior to defining the continuous fitting surface, the input horizon can be filtered from noises possessing high frequencies, such as corrugations and bumps, while preserving natural deformations.

FIG. 11 shows results when applying a stress and fracture modeling method to a synthetic example using a flattened horizon, according to one or more embodiments disclosed. FIG. 11A presents a model configuration showing the horizon 1102 and the fault surface 1104. FIG. 11B shows a comparison of the original dip-slip 1106 (left) and the recovered dip-slip 1108 (right). FIG. 11C shows a comparison of the original strike-slip 1110 (left) and the recovered strike-slip 1112 (right). FIG. 11D shows original vertical displacement 1114 (left) from the flattened horizon (left) and recovered vertical displacement 1116 (right) from the flattened horizon.

As shown in FIG. 11, a complex shaped fault is initially constrained by a far field stress, and consequently slips to accommodate the remote stress. At each point of an observation plane cross-cutting the fault, the stress and fracture modeling engine 102 computes the resulting displacement vector and deforms the grid accordingly. Then, inversion takes place using the fault geometry. After flattening the deformed grid, the change in elevation for each point is used to constrain the inversion and to recover the previously imposed far field stress as well as the fault slip and the displacement field. The comparison of the original and inverted dip-slip (FIG. 11B) and strike-slip (FIG. 11C) show that they match well (same scale). A good match is also observed for the displacement field at the observation grid (FIG. 11D).

Using Dip-Slip Information

When dip-slip data is used, the cost function is defined as in Equation (36):

$$f_{ds}(\alpha_1, \alpha_2, \alpha_3) = \frac{1}{m}\sum_P\left(1 - \left(\frac{b_e^c}{b_e^m}\right)^2\right)^{1/2} \quad (36)$$

where $b_e^m$ is the measured dip-slip magnitude for a triangular element e, and $b_e^c$ is the computed dip-slip magnitude.

Using Available Information

The stress and fracture modeling engine 102 can combine the previously described cost functions to better constrain stress inversion using available data (e.g., fault and fracture plane orientation data, GPS data, InSAR data, flattened horizons data, dip-slip measurements from seismic reflection, fault striations, etc.). Furthermore, data can be weighted differently, and each datum can also support a weight for each coordinate.

Multiple Tectonic Events

For multiple tectonic events, it is possible to recover the major ones, e.g., those for which the tectonic regime and/or the orientation and/or magnitude are noticeably different. Algorithm 2, below, presents a way to determine different events from fracture orientation (joints, stylolites, conjugate fault planes) measured along wellbores.

After doing a first simulation, a cost is attached at each observation point which shows the confidence of the recovered tectonic stress relative to the data attached to that observation point. A cost of zero means a good confidence, while a cost of one means a bad confidence. See FIG. 7 for an example plot of the cost. By selecting data points that are under a given threshold value and running another simulation with these points, it is possible to extract a more precise paleostress value. Then, the remaining data points above the threshold value can be used to run another simulation with the paleostress state to recover another tectonic event. If the graph of the new cost shows disparities, the example method above is repeated until satisfactory results are achieved. During the determination of the tectonic phases, the observation points are classified in their respective tectonic event. However, the chronology of the tectonic phases remains undetermined.

---

ALGORITHM (2): Detecting Multiple Tectonic Events

---

Input: $\epsilon$ as a user threshold in [0, 1]
Input: S = all fractures from all wells
Let: T =
while S ≠ do
    Simulations: Compute the cost for each fracture in S
    if max(cost) < $\epsilon$ then
    Detect a tectonic event $\sigma_R$ for fractures in S
    if T = then
        Terminate
    else
        S = T
        T =
        continue
    end
    S = fractures below $\epsilon$
    T += fractures above $\epsilon$
end

---

Seismic Interpretation Quality Control

It can be useful to have a method for quality control (QC) for interpreted faults geometries from seismic interpretation. The fracture orientations from wellbores can be used to recover the far field stress and the displacement discontinuities on active faults. Then, the computed displacement field is used to deform the initially flattened horizons. The geometry of the resulting deformed horizons can be compared with the interpreted ones. If some mismatches are clearly identified (e.g., interpreted uplift and computed subsidence), then the fault interpretation is possibly false. For example, an interpreted fault might dip in the wrong direction. An unfolded horizon can be approximated by its mean plane, as described above in relation to flattened horizons.

Figure 12:
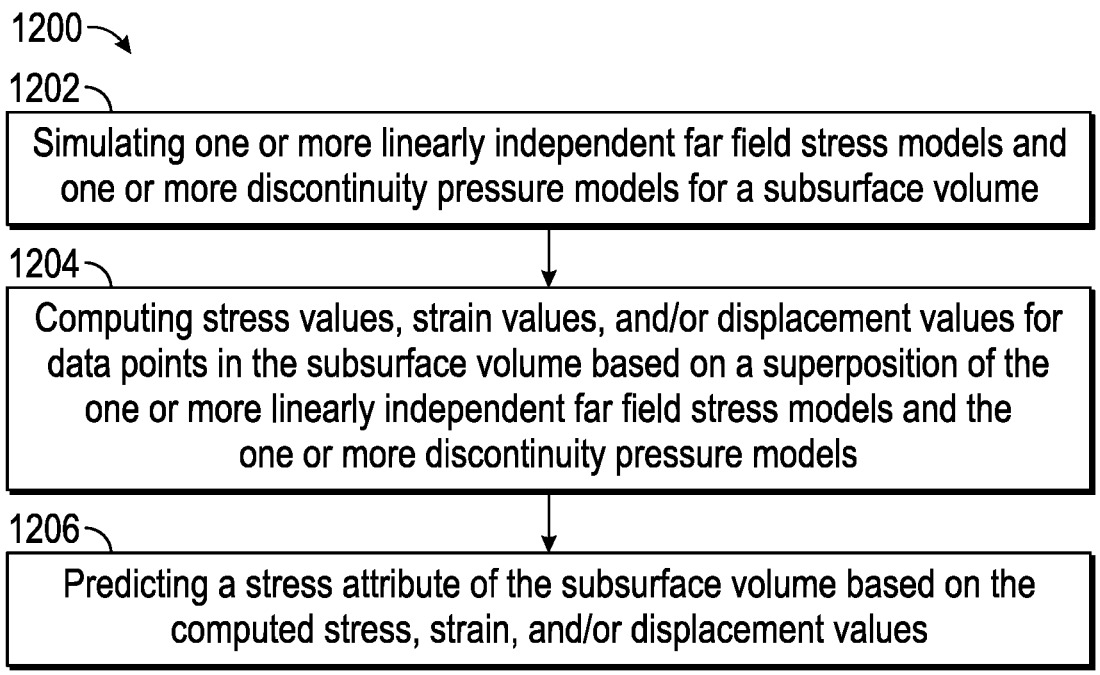
FIG. 12 depicts a flow diagram of an illustrative method of stress and fracture modeling using the principle of superposition, according to one or more embodiments disclosed.

FIG. 12 shows a flowchart of a method 1200 of stress and fracture modeling using the principle of superposition, according to one or more embodiments disclosed. The example method 1200 may be performed by hardware or combinations of hardware and software, for example, by the example stress and fracture modeling engine.

One or more linearly independent far field stress models and one or more discontinuity pressure models for a subsurface volume can be simulated, as shown at 1202.

Stress values, strain values, and/or displacement values for data points in the subsurface volume can be computed, based on a superposition of the one or more linearly independent far field stress models and the one or more discontinuity pressure models, as shown at 1204.

A stress attribute of the subsurface volume can be iteratively predicted based on the computed stress, strain, and/or displacement values, as shown at 1206.

Figure 13:
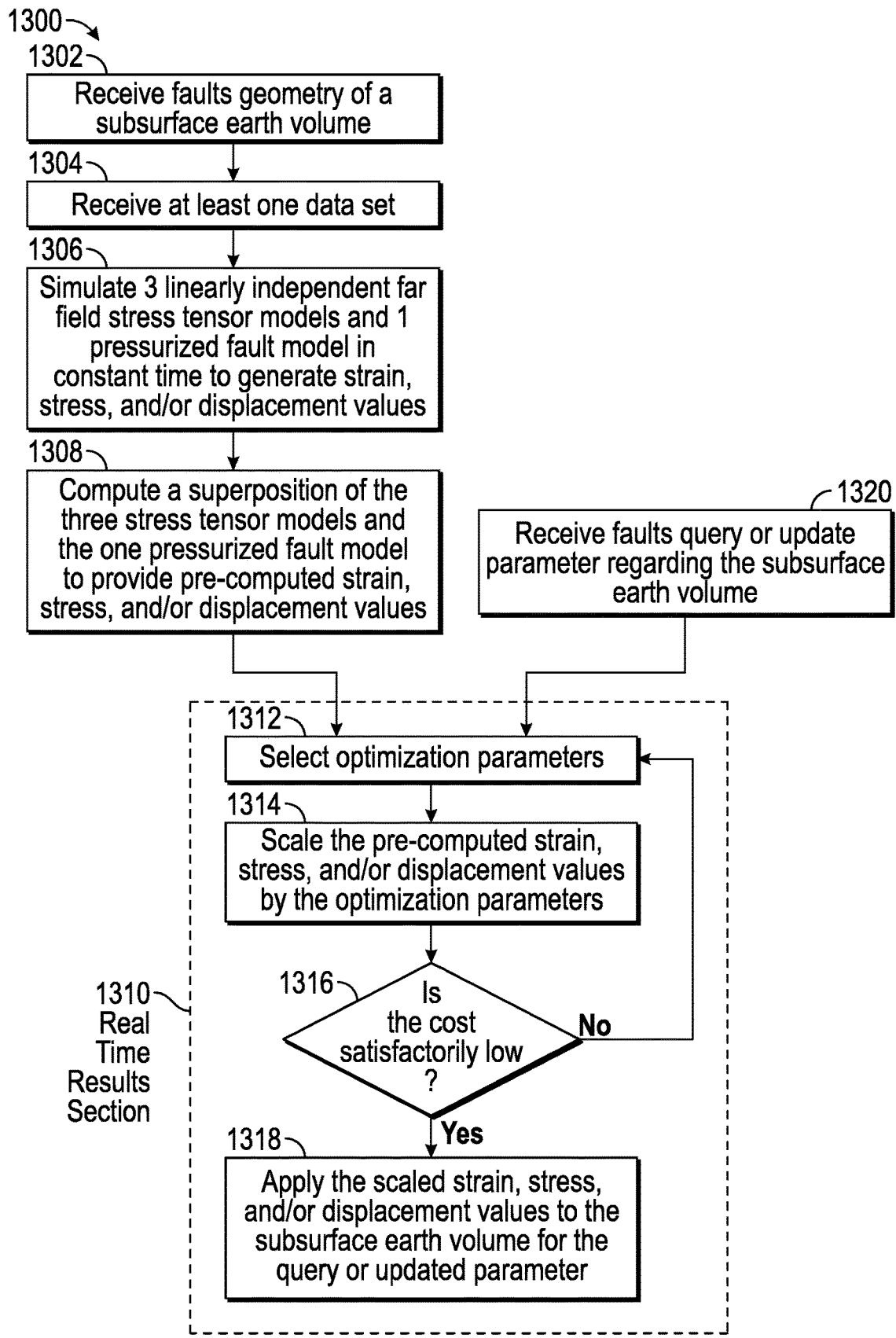
FIG. 13 depicts a flow diagram of an illustrative method of stress and fracture modeling using the principle of superposition and a cost function, according to one or more embodiments disclosed.

FIG. 13 shows a flowchart of a method 1300 of stress and fracture modeling using the principle of superposition, according to one or more embodiments disclosed. The method 1300 may be performed by hardware or combinations of hardware and software, for example, by the stress and fracture modeling engine 102.

Fault geometries for a subsurface earth volume can be received, as shown at 1302.

At least one data set associated with the subsurface earth volume can also be received, as shown at 1304.

One or more (e.g., three) linearly independent far field stress tensor models and one or more (e.g., one) discontinuity pressure models can be simulated in constant time, as shown at 1306. The discontinuity pressure model can be or include a model of a fault, dyke, salt dome, magma chamber, or a combination thereof.

A superposition of the three linearly independent far field stress tensor models and the discontinuity pressure model can be computed to provide computed strain, stress, and/or displacement values, as shown at 1308.

A post-process segment of the method 1300 can commence, which can compute numerous real-time results based on the principle of superposition, as shown at 1310. This can involve inversion of the one or more linearly independent far field stress models and/or the one or more discontinuity pressure models.

Optimization parameters for each of the linearly independent far field stress tensor models and fault pressure can be selected, as shown at 1312

The computed stress, strain, and/or displacement values can be scaled by the optimization parameters, as shown by 1314

A cost associated with the scaled computed stress, strain, and/or displacement values can be evaluated, as shown by 1316. If the cost is not satisfactory, then the method 1300 loops back to 1312 to select new optimization parameters. If the cost is satisfactory, then the method 1300 continues to 1318.

The scaled strain, stress, and/or displacement values can be applied to the subsurface earth volume, e.g., with respect to a query about the subsurface earth volume or in response to an updated parameter about the subsurface earth volume, as shown by 1318.

A fault(s) query and/or updated parameter regarding the subsurface earth volume can be received, that seeds or initiates generation of the post-process results in the real-time results section (1310), as shown by 1320.

Based on the solution of an angular dislocation in a 3D homogeneous isotropic elastic whole- or half-space, the pressure inside discontinuities (e.g., faults, dykes, salt domes, magma chambers) and the regional stress regime (e.g., orientation of the maximum principal horizontal stress according to North) can be inverted. The stress ratio can be defined as in Equation (37):

$$R=(\sigma_2-\sigma_3)/(\sigma_1-\sigma_3) \quad (37)$$

Pressure can be inverted relative to the maximum shear stress $(\sigma_1-\sigma_3)$, e.g., the difference between maximum and minimum principal inverted regional stress. Equation (38) shows the relationship between the real pressure and the normalized inverted pressure:

$$p=\bar{p}/(\sigma_1\sigma_3) \quad (38)$$

where $\bar{p}$ represents the real pressure and p the normalized inverted pressure.

Three dimensional discontinuities making the cavities, faults, and/or salt domes can be discretized as complex 3D triangular surfaces. To constrain the inversion, at least a portion of the data can be used and combined together such as any fracture orientation (e.g., joints, stylolites) or wellbore ovalization, GPS or InSAR data, microsismicity or focal mechanisms with or without magnitude information, tiltmeters, or the like. Four preliminary simulation results at data points are used to invert for both the pressure and the regional stress. The transformation matrix from the four solutions and the linear coefficient to a given far field stress is given by Equation (39):

$$\begin{pmatrix} \sigma_{xx}^1 & \sigma_{xx}^2 & \sigma_{xx}^3 & 0 \\ \sigma_{xy}^1 & \sigma_{xy}^2 & \sigma_{xy}^3 & 0 \\ \sigma_{yy}^1 & \sigma_{yy}^2 & \sigma_{yy}^3 & 0 \\ 0 & 0 & 0 & p_0 \end{pmatrix} \alpha = A\alpha = \begin{Bmatrix} \sigma_{xx} \\ \sigma_{xy} \\ \sigma_{yy} \\ Pp \end{Bmatrix} = \sigma_R \quad (39)$$

where $\sigma_{xx}^i$, $\sigma_{xy}^i$ and $\sigma_{yy}^i$ represent the regional stress parameters for simulation $i \in [0,3]$ and for which the perturbed stress and displacement fields at data are computed and stored. $p_0$ is a pressure (different from 0) and for which the perturbed stress and displacement fields at data are computed and stored.

Thus, for a given remote stress and fault pressure p, $$\sigma_R = \begin{Bmatrix} \sigma_{xx} \\ \sigma_{xy} \\ \sigma_{yy} \\ p \end{Bmatrix},$$

coefficients $\alpha=\{\alpha_1, \alpha_2, \alpha_3, \alpha_4\}^T$ are computed from Equation (39) using $\alpha=A^{-1}\sigma_R$. The perturbed stress, strain, and/or displacement at a point P can be given by the linear combination of the stored solutions at p using the same coefficients $\alpha$. This can be used to find the best $\alpha$, and therefore to invert for both the regional stress and the pressure using Equation (39).

Figure 14:
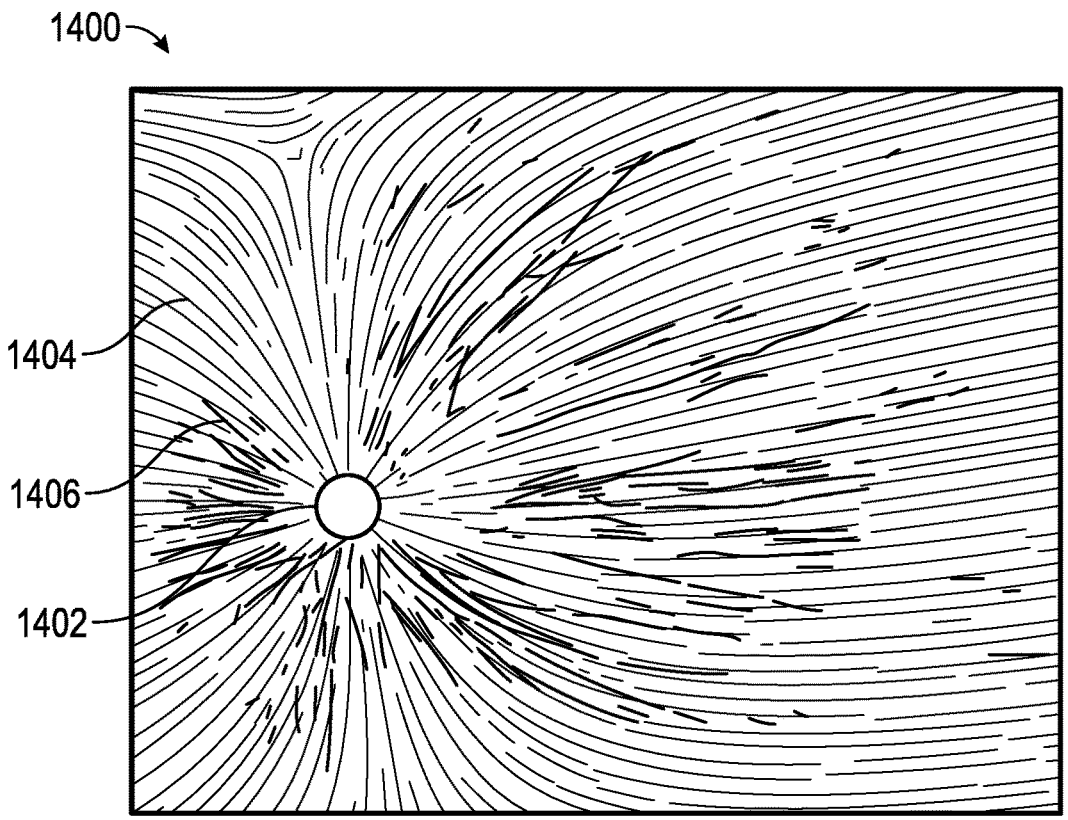
FIG. 14 depicts a model showing dykes orientations from inversion of the pressure inside a vertical plug, according to one or more embodiments disclosed.

FIG. 14 illustrates a model 1400 showing dykes orientations from inversion of the pressure inside a vertical plug 1402, according to one or more embodiments disclosed. The model 1400 is in half-space with no rigid boundary. The thin lines 1404 represent the predicted dykes orientation, and the thick lines 1406 represent the observed dykes orientation. The inverted stress regime gives R=0.04 in the normal fault regime with θ=N81E for the orientation. The inverted normalized pressure is 1.4. In other words, the inverted normalized pressure is 1.4 times greater than $(\sigma_1-\sigma_3)$.

Figure 15:
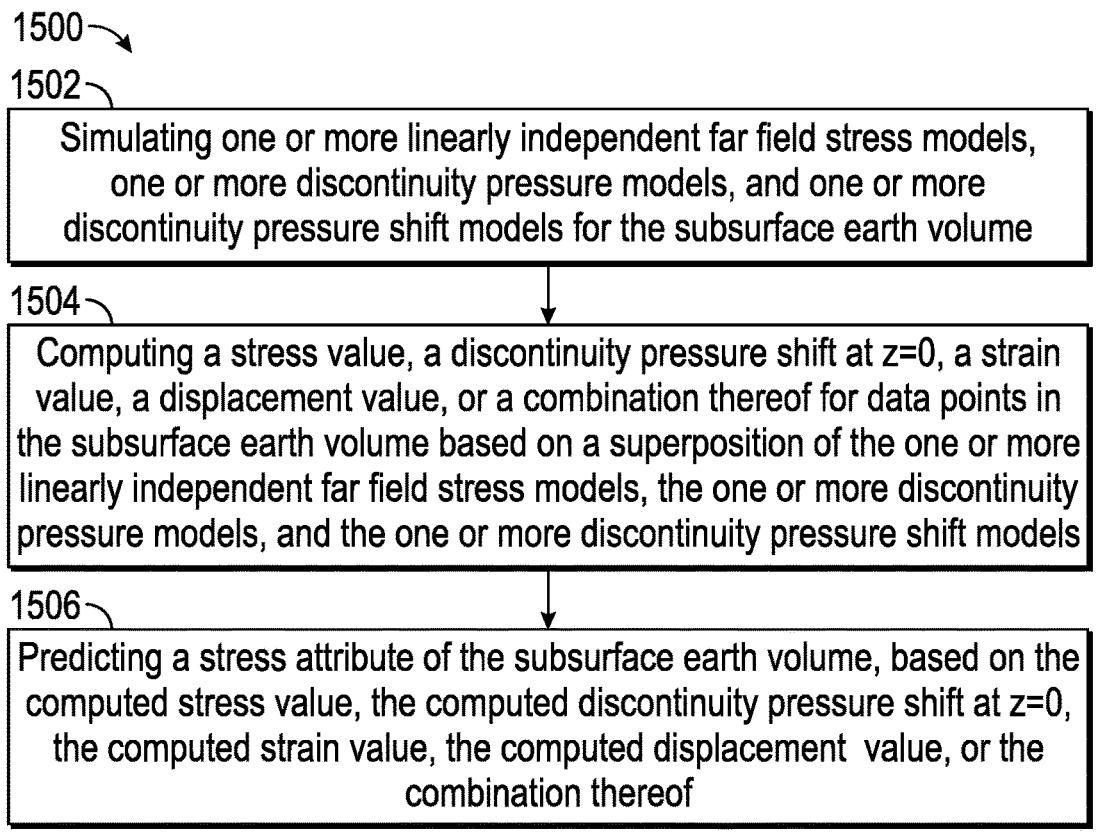
FIG. 15 depicts a flowchart of a method of stress and fracture modeling using the principle of superposition, according to one or more embodiments disclosed.

FIG. 15 illustrates a flowchart of a method 1500 of stress and fracture modeling using the principle of superposition, according to one or more embodiments disclosed. The method 1500 may include simulating one or more (e.g., three) linearly independent far field stress models, one or more (e.g., one) discontinuity pressure models, and one or more discontinuity pressure shift models for the subsurface earth volume, as at 1502.

The linearly independent far field stress model(s) may include parameters (Sxx, Sxy, Syy, Szz) of one or more far field stresses that are linearly-independent. For instance, one solution may include selecting the first simulation Sxx=1 and the other Sij=0. For the second simulation, the user may select Sxy=1 and the other Sij=0. The user may then select Syy=1 and the other Sij=0. Finally, the user may select Szz=1 and the the other Sij=0. This may lead to the identity matrix for A. The discontinuity pressure model may include the pressure inside the discontinuity. This may be modelled using a non-null initial boundary value for the third axis of each triangular element, which is parallel to the normal of the triangular element. The gradient far field stress and pressure may have a dependence upon the depth (z). The discontinuity pressure shift model may be or include the value(s) of the pressure at depth z=0 (e.g., at the surface of the Earth). Mathematically, it may be represented as the y-intercept, while the pressure itself may be the slope.

The one or more linearly independent far field stress models, one or more discontinuity pressure models, and one or more discontinuity pressure shift models may be generated using data captured by sensors in a wellbore or at the surface, as described in greater detail above. For example, the sensors may be part of a measurement-while-drilling ("MWD") tool or a logging-while-drilling ("LWD") tool in the wellbore, of the sensors may be seismic receivers positioned at the surface.

The one or more linearly independent far field stress models may be or include three linearly independent far field stress models that are based on different data sets, each data set including fault geometry data, fracture orientation data, stylolites orientation data, secondary fault plane data, fault throw data, slickenline data, global positioning system (GPS) data, interferometric synthetic aperture radar (InSAR) data, laser ranging data, tilt-meter data, displacement data for a geologic fault, stress magnitude data for the geologic fault, or a combination thereof. The discontinuity pressure model can be or include a model of a fault, dyke, salt dome, magma chamber, or a combination thereof.

The method 1500 may also include computing a stress value, a discontinuity pressure shift at (or proximate to) a surface of the Earth (e.g., at z=0), a strain value, a displacement value, or a combination thereof for data points in the subsurface earth volume based on a superposition of the one or more linearly independent far field stress models, the one or more discontinuity pressure models, and the one or more discontinuity pressure shift models, as at 1502. The discontinuity pressure shift may occur at the surface of the Earth, be measured at the surface of the Earth, or both.

The method 1500 may also include predicting a stress attribute of the subsurface earth volume, based on the computed stress value, the computed discontinuity pressure shift at the surface of the Earth, the computed strain value, the computed displacement value, or the combination thereof, as at 1506. The predicted stress attribute may be or include a stress inversion, a stress field, a far field stress value, a stress interpolation in a complex faulted reservoir, a perturbed stress field, a stress ratio and associated orientation, one or more tectonic events, a displacement discontinuity of a fault, a fault slip, an estimated displacement, a perturbed strain, a slip distribution on faults, quality control on interpreted faults, fracture prediction, prediction of fracture propagation according to perturbed stress field, real-time computation of perturbed stress and displacement fields while performing interactive parameters estimation, or discernment of an induced fracture from a preexisting fracture.

The user may use the predicted stress attribute to vary a trajectory of a wellbore and/or to plan the location of a new wellbore (e.g., to avoid a breakout). In addition, the weight on a drill bit drilling the wellbore may be varied in response to the stress attribute. Moreover, the type or flow rate of mud being pumped into the wellbore may be selected or varied in response to the stress attribute.

The method 1500 may be used to invert for both the gradient pressure inside 3D discontinuities (which can represent faults, dykes, magma chamber, salt domes, etc.), the gradient regional stress regime, and the constant shifted pressure value (e.g., salt-pressure-shift: called "Sps"). The method 1500 may extend the methods 1200 and 1300 to gradient pressure and far field stress (dependency to depth) and incorporate the inversion of the new parameter: Sps.

Based on the solution of an angular dislocation in a 3D homogeneous isotropic elastic whole-space or half-space, it may be possible to invert for the gradient pressure inside discontinuities (e.g., faults, salt domes, magma chambers, etc.) and the gradient regional stress regime (e.g., orientation of the maximum principal horizontal stress according to the North, and the ratios $R_h=\sigma_h/\sigma_v$ and $R_H=\sigma_H/\sigma_v$). The Sps parameter may not depend on depth and instead corresponds to the intersection of the gradient pressure linear function as a function of depth with the Earth's surface.

Three-dimensional discontinuities making the cavities, faults, and/or salt domes may be discretized as complex 3D triangular surfaces. To constrain the inversion, several parameters may be used and combined together such as any fracture orientation (e.g., joints, stylolites, etc.), wellbore ovalization, gps or insar data, microseismicity or focal mechanisms with or without magnitude information, tiltmeters, and the like.

The same principle of superposition that was used above may be used here, but inverting for both the pressure and the regional stress may include storing not three but six preliminary simulation results as data points. In the method 1500, as opposed to one or more of the other methods disclosed above, discontinuities may now open or close due to pressure boundary conditions, and as a result, the classical stress ratio may not be used in this situation.

The transformation matrix from the six solutions and the linear coefficient to a given far field stress may be given by Equation (40):

$$I_6\alpha = \begin{array}{c}\sigma_{xx}\\\sigma_{xy}\\\sigma_{yy}\\\sigma_{zz}\\Sps\\Pr\end{array} = \sigma_R \quad (40)$$

where $I_6$ represents the identity matrix of dimension six, Sps represents a salt-pressure-shift, Pr represents the pressure inside discontinuities, and α represents the six linear coefficients.

Consequently, α may represent the parameters of the far field stress.

Then, for a given far field stress $$\sigma_R = \begin{array}{c}\sigma_{xx}\\\sigma_{xy}\\\sigma_{yy}\\\sigma_{zz}\\Sps\\Pr\end{array} = \alpha,$$

the perturbed stress, strain or displacement at a point p may be given by the linear combination of the stored solutions at p using the same coefficients α. Using the same cost functions described above, it is therefore possible to find a more accurate α, and therefore to invert for both the regional stress, pressure and pressure shift using Equation (40).

In order to take into account the gradient far field stress and gradient pressure for the superposition, a user may compute the six initial solutions using the gradient. The gradient far field stress is defined as:

$\sigma_v = \rho_{sed}gz$ $\sigma_H = R_H \rho_{sed}gz$ $\sigma_h = R_h \rho_{sed}gz$ The pressure and pressure shift are defined as:

$P_r = \rho_{salt}gz$ $Sps = C^{st}$

Normalizing by $\sigma_v$, the results may include:

$\sigma_v = 1$ $\sigma_H = R_H$ $\sigma_h = R_h$ $P_r = \rho_{salt}/\rho_{sed}$ $Sps = C^{st}/\sigma_v$ Consequently, as use $I_6$ is used, the six initial solutions that may be used for superposition are computed using:

$\sigma_{ij}=0, \sigma_{xx}=|z|, Sps=0, Pr=0$  1)

$\sigma_{ij}=0, \sigma_{xy}=|z|, Sps=0, Pr=0$  2)

$\sigma_{ij}=0, \sigma_{yy}=|z|, Sps=0, Pr=0$  3)

$\sigma_{ij}=0, \sigma_{zz}=|z|, Sps=0, Pr=0$  4)

$\sigma_{ij}=0, Sps=0, Pr=0$  5)

$\sigma_{ij}=0, Sps=0, Pr=0$  6)

The pressure inside the discontinuity at depth z may be given by $P_z = Sps + P_r|z|$.

CONCLUSION AND PERSPECTIVES

The stress and fracture modeling engine 102 applies the property of superposition that is inherent to linear elasticity to execute real-time computation of the perturbed stress and displacement field around a complexly faulted area, as well as the displacement discontinuity on faults. Furthermore, the formulation executed by the stress and fracture modeling engine 102 enables rapid paleostress inversion using multiple types of data such as fracture orientation, secondary fault planes, GPS, InSAR, fault throw, and fault slickenlines. In one implementation, using fracture orientation and/or secondary fault planes from wellbores, the stress and fracture modeling engine 102 recovers one or more tectonic events, and the recovered stress tensor are given by the orientation and ratio of the principal magnitudes. The stress and fracture modeling engine 102 can be applied across a broad range of applications, including stress interpolation in a complexly faulted reservoir, fractures prediction, quality control on interpreted faults, real-time computation of perturbed stress and displacement fields while doing interactive parameter estimation, fracture prediction, discernment of induced fracturing from preexisting fractures, and so forth.

Another application of the stress and fracture modeling engine 102 is evaluation of the perturbed stress field (and therefore the tectonic event(s)) for recovering "shale gas." Since shale has low matrix permeability, fractures are used to provide permeability to produce gas production in commercial quantities. This may be done by hydraulic fracturing to create extensive artificial fractures around wellbores.

Figure 16:
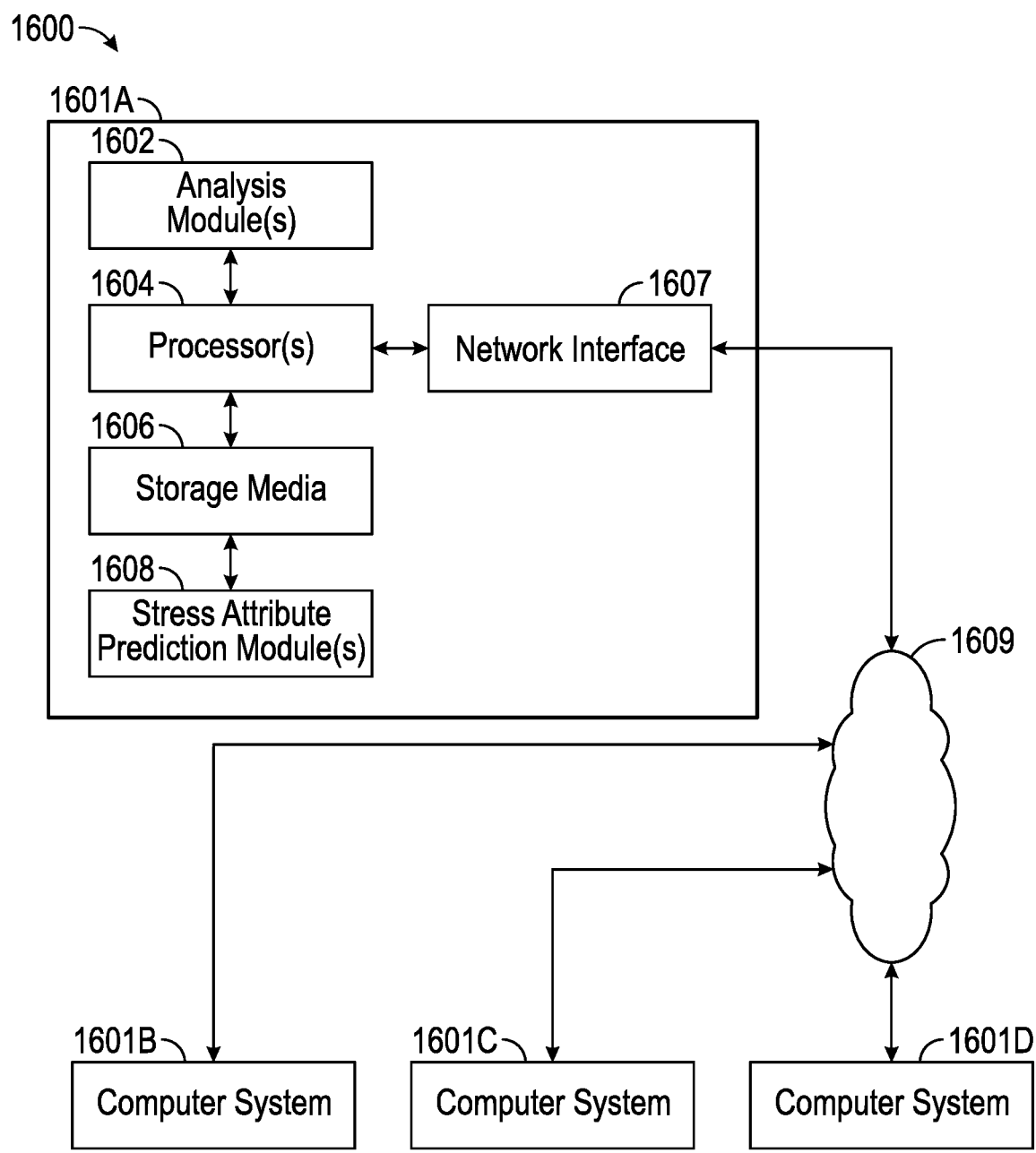
FIG. 16 depicts a computing system for performing at least a portion of the methods shown in FIGS. 12, 13, and 15, according to an embodiment.

In some embodiments, the methods of the present disclosure may be executed by a computing system. FIG. 16 illustrates an example of such a computing system 1600, in accordance with some embodiments. The computing system 1600 may include a computer or computer system 1601A, which may be an individual computer system 1601A or an arrangement of distributed computer systems. The computer system 1601A includes one or more analysis modules 1602 that are configured to perform various tasks according to some embodiments, such as one or more methods disclosed herein. To perform these various tasks, the analysis module 1602 executes independently, or in coordination with, one or more processors 1604, which is (or are) connected to one or more storage media 1606. The processor(s) 1604 is (or are) also connected to a network interface 1607 to allow the computer system 1601A to communicate over a data network 1609 with one or more additional computer systems and/or computing systems, such as 1601B, 1601C, and/or 1601D (note that computer systems 1601B, 1601C and/or 1601D may or may not share the same architecture as computer system 1601A, and may be located in different physical locations, e.g., computer systems 1601A and 1601B may be located in a processing facility, while in communication with one or more computer systems such as 1601C and/or 1601D that are located in one or more data centers, and/or located in varying countries on different continents).

A processor may include a microprocessor, microcontroller, processor module or subsystem, programmable integrated circuit, programmable gate array, or another control or computing device.

The storage media 1606 may be implemented as one or more computer-readable or machine-readable storage media. Note that while in the example embodiment of FIG. 16 storage media 1606 is depicted as within computer system 1601A, in some embodiments, storage media 1606 may be distributed within and/or across multiple internal and/or external enclosures of computing system 1601A and/or additional computing systems. Storage media 1606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1600 contains one or stress attribute prediction module(s) 1608. The stress attribute prediction module 1608 may be used to perform at least a portion of the method 1200, 1300, and/or 1500.

It should be appreciated that computing system 1600 is only one example of a computing system, and that computing system 1600 may have more or fewer components than shown, may combine additional components not depicted in the example embodiment of FIG. 16, and/or computing system 1600 may have a different configuration or arrangement of the components depicted in FIG. 16. The various components shown in FIG. 16 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. A method, comprising:
   receiving at least one value for a pressure inside a three-dimensional discontinuity in the earth;
   receiving at least four values for a regional stress regime in the earth;
   receiving at least one value for a constant shifted pressure measured at a surface of the earth;
   building a transformation matrix comprising the at least one value for the pressure, the at least four values for the regional stress regime, and the at least one value for the constant shifted pressure;

generating an inverted matrix by inverting the transformation matrix;

determining a parameter vector based at least partially upon the inverted matrix and a cost function;

based at least in part on the parameter vector, computing a paleostress vector representing a fractured region of the earth;

determining a tectonic regime based at least in part on the paleostress vector;

associating the tectonic regime with at least one fault of the fractured region of the earth; and generating at least one parameter to configure a control signal based upon the at least one fault, wherein the control signal is configured to cause equipment to perform a physical operation, and wherein the equipment comprises drilling equipment, exploration equipment, a well control injector, a valve, or a combination thereof.

2. The method of claim 1, wherein the constant shifted pressure comprises a salt-pressure-shift.

3. The method of claim 1, wherein the transformation matrix comprises one column with six rows.

4. The method of claim 1, wherein the transformation matrix comprises an identity matrix of dimension six multiplied by six linear coefficients.

5. The method of claim 4, wherein the six linear coefficients comprise parameters of a far field stress in the earth.

6. The method of claim 1, further comprising predicting propagation of a fracture in the fractured region of the earth based at least partially upon the at least one fault.

7. The method of claim 1, wherein the at least one value for the constant shifted pressure corresponds to an intersection of the pressure inside the three-dimensional discontinuity with a surface of the earth.

8. A computing system, comprising:
a processor; and
a memory system comprising one or more non-transitory computer readable media storing instructions thereon that, when executed by the processor, are configured to cause the computing system to perform operations, the operations comprising:
receiving at least one value for a pressure inside a three-dimensional discontinuity in the earth;
receiving at least four values for a regional stress regime in the earth;
receiving at least one value for a constant shifted pressure measured at a surface of the earth;
building a transformation matrix comprising the at least one value for the pressure, the at least four values for the regional stress regime, and the at least one value for the constant shifted pressure;
generating an inverted matrix by inverting the transformation matrix;
determining a parameter vector based at least partially upon the inverted matrix and a cost function;
based at least in part on the parameter vector, computing a paleostress vector representing a fractured region of the earth;
determining a tectonic regime based at least in part on the paleostress vector;
associating the tectonic regime with at least one fault of the fractured region of the earth; and
generating at least one parameter to configure a control signal based upon the at least one fault, wherein the control signal is configured to cause equipment to perform a physical operation, and wherein the equipment comprises drilling equipment, exploration equipment, a well control injector, a valve, or a combination thereof.

9. The computing system of claim 8, wherein the constant shifted pressure comprises a salt-pressure-shift.

10. The computing system of claim 8, wherein the transformation matrix comprises one column with six rows.

11. The computing system of claim 8, wherein the transformation matrix comprises an identity matrix of dimension six multiplied by six linear coefficients.

12. The computing system of claim 11, wherein the six linear coefficients comprise parameters of a far field stress in the earth.

13. The computing system of claim 8, wherein the operations further comprise predicting propagation of a fracture in the fractured region of the earth based at least partially upon the at least one fault.

14. A non-transitory computer readable medium storing instructions thereon that, when executed by a processor, are configured to cause the processor to perform operations, the operations comprising:
receiving at least one value for a pressure inside a three-dimensional discontinuity in the earth;
receiving at least four values for a regional stress regime in the earth;
receiving at least one value for a constant shifted pressure measured at a surface of the earth;
building a transformation matrix comprising the at least one value for the pressure, the at least four values for the regional stress regime, and the at least one value for the constant shifted pressure;
generating an inverted matrix by inverting the transformation matrix;
determining a parameter vector based at least partially upon the inverted matrix and a cost function;
based at least in part on the parameter vector, computing a paleostress vector representing a fractured region of the earth;
determining a tectonic regime based at least in part on the paleostress vector;
associating the tectonic regime with at least one fault of the fractured region of the earth; and
generating at least one parameter to configure a control signal based upon the at least one fault, wherein the control signal is configured to cause equipment to perform a physical operation, and wherein the equipment comprises drilling equipment, exploration equipment, a well control injector, a valve, or a combination thereof.

15. The non-transitory computer readable medium of claim 14, wherein the transformation matrix comprises one column with six rows.

16. The non-transitory computer readable medium of claim 14, wherein the transformation matrix comprises an identity matrix of dimension six multiplied by six linear coefficients.

* * * * *